US012525075B1

(12) United States Patent
Nguyen et al.

(10) Patent No.: US 12,525,075 B1
(45) Date of Patent: Jan. 13, 2026

(54) SYSTEM AND METHOD FOR DETECTING ODOMETER TAMPERING USING ON-BOARD VEHICLE DIAGNOSTIC DATA

(71) Applicant: Innova Electronics Corporation, Irvine, CA (US)

(72) Inventors: Truong Hai Lam Nguyen, Ho Chi Minh (VN); Thuan Cong Huynh, Ho Chi Minh (VN); Keith Andreasen, Garden Grove, CA (US); Phuong Pham, Fountain Valley, CA (US); Bruce B. Brunda, Newport Beach, CA (US)

(73) Assignee: Innova Electronics Corporation, Irvine, CA (US)

( * ) Notice: Subject to any disclaimer, the term of this patent is extended or adjusted under 35 U.S.C. 154(b) by 0 days.

(21) Appl. No.: 19/261,194

(22) Filed: Jul. 7, 2025

(51) Int. Cl.
*G07C 5/08* (2006.01)

(52) U.S. Cl.
CPC .......... *G07C 5/0825* (2013.01); *G07C 5/085* (2013.01)

(58) Field of Classification Search
CPC .............................. G07C 5/0825; G07C 5/085
See application file for complete search history.

(56) References Cited

U.S. PATENT DOCUMENTS

| | | | | |
|---|---|---|---|---|
| 8,032,419 | B2 | 10/2011 | Chenn | |
| 8,798,852 | B1 | 8/2014 | Chen | |
| 10,640,060 | B2 | 5/2020 | Chen | |
| 11,625,962 | B2 | 4/2023 | Brunda | |
| 2014/0337319 | A1 | 11/2014 | Chen | |
| 2016/0147521 | A1 | 5/2016 | Hieronymi | |
| 2019/0035173 | A1* | 1/2019 | Harvey | G07C 5/008 |
| 2021/0084015 | A1* | 3/2021 | Benson | H04W 12/03 |

* cited by examiner

*Primary Examiner* — Behrang Badii
(74) *Attorney, Agent, or Firm* — Stetina Garred Brucker & Newboles

(57) ABSTRACT

A diagnostic system and method for detecting odometer tampering by retrieving and comparing vehicle operation data, such as mileage-related data from multiple electronic control units (ECUs) through a vehicle's diagnostic link connector (DLC). The system accesses both standardized and non-standardized parameter identifiers (PIDs), including manufacturer-specific data from modules such as the engine control module (ECM), body control module (BCM), anti-lock braking system (ABS), and gateway module. By comparing the displayed odometer reading against internally stored or alternative mileage values, the system identifies inconsistencies indicative of tampering. Cloud-based historical data may be included to further enhance verification accuracy. The invention enables reliable odometer validation using data already embedded within the vehicle's electronic architecture.

9 Claims, 7 Drawing Sheets

OBD-II Data Table for Odometer Fraud Detection

| Mode | PID | Parameter Name | Description | Contribution to Fraud Detection | Strength |
|---|---|---|---|---|---|
| $01 | $1F | Run Time Since Engine Start | Engine runtime during current key cycle (in seconds) | Limited use alone; helpful for understanding driving patterns when combined with other data | Low |
| $01 | $21 | Distance Traveled Since MIL Activated | Distance traveled (in km) since check engine light was last triggered | Can reveal high mileage if odometer shows a lower value; indicates post-fault distance | Moderate to High |
| $01 | $31 | Distance Traveled Since DTCs Cleared | Distance traveled (in km) since last code clear | Can detect minimum recent mileage; mismatches suggest recent tampering or reset | High |
| $01 | $2F | Fuel Level Input | Percentage of fuel tank filled | Limited; useful when logged over time with trip data for inferred usage | Low |
| $01 | $5E | Fuel Rate | Real-time fuel consumption (L/h or gal/h) | Can estimate mileage over time when combined with fuel level, consumption patterns, and history | Moderate |
| $09 | $02 | VIN | Vehicle Identification Number | Enables access to external service or inspection history for cross-verifying odometer values | Indirect but Important |
| $09 | $0F | Total Engine Run Time (if supported) | Total cumulative engine operating hours since manufacture | Strongest indirect mileage estimator when paired with average speed assumption | Very High |

Notes:

. Mode $01 refers to real-time powertrain data.

. Mode $09 includes vehicle information, often used in emissions and inspection frameworks.

. Some PIDs like $0F are not universally supported, but where available, they are powerful tools for estimating cumulative mileage.

. This table includes only standardized PIDs under SAE J1979. Manufacturer-specific PIDs can provide more precise odometer values but are not universally accessible.

FIG. 3

FIG. 4

Non-Standard DLC Data for Odometer Fraud Detection

| PID or Service | Parameter Name | Description | Contribution to Fraud Detection | Access Method / Notes |
|---|---|---|---|---|
| $0xA6 | Secondary Odometer Reading | Mileage value stored in a non-instrument-cluster ECU (e.g., ABS, TCM, or BCM) | Used to compare against the primary odometer; discrepancies suggest tampering | Manufacturer-specific; often accessed via UDS ReadDataByIdentifier (0x22) |
| $0x31 | Routine Mileage Check | Triggers a diagnostic routine that returns mileage from a control module | Structured output used to verify distance stored in non-visible ECUs | Accessed using UDS RoutineControl(0x31); requires session control |
| Memory Address Reads | Direct EEPROM Mileage Value | Raw mileage data stored in ECU EEPROM or flash memory | Highly reliable for cross-verification when memory layout is known | Requires specific address mapping; accessed via UDS ReadMemoryByAddress (0x23) |
| Key Log / MyKey Data | Key-Specific Usage Log | Mileage and runtime tracked per key or user profile | Shows real-world usage even if cluster was swapped or reset | Accessible via OEM software (e.g., Ford IDS); typically stored in BCM |
| Engine Control Module Runtime | Total Engine Hours | Cumulative engine runtime stored in ECM or PCM | Multiplied by average speed to estimate total mileage | Manufacturer-specific PID or UDS 0x22; not available in all vehicles |
| Crash Event Data (CED) | Odometer at Time of Crash | Mileage stored by the airbag module at time of impact | Confirms past mileage snapshot; useful if current value is lower | Requires Bosch CDR or equivalent forensic tool; not via OBD-II |
| Infotainment Log Snapshot | Last Known Mileage in System Memory | Cached mileage in navigation or telematics unit | Can reveal past mileage inconsistent with current display | Accessed via OEM or engineering tools; sometimes via MOST or Ethernet, not always OBD |
| Gateway Diagnostic Log | Odometer During Programming Event | Mileage value stored during ECU programming or service | Historical data used to identify rollback after reprogramming | Accessed via OEM tools in engineering/developer mode (e.g., BMW ISTA, Mercedes Xentry) |

Notes:

. This table includes non-standard, manufacturer-specific data retrievable through the DLC port using enhanced protocols.

. Most parameters are accessed using UDS (ISO 14229) services such as 0x22 (ReadDataByIdentifier), 0x23 (ReadMemoryByAddress), or 0x31 (RoutineControl).

. Access to some values (e.g., infotainment snapshots or crash event data) may require OEM or forensic tools and may not use the OBD-II physical interface exclusively.

. PID values and access routines vary between manufacturers and vehicle models; successful retrieval may require OEM credentials or engineering mode access.

ODOMETER FRAUD DETECTION EXAMPLES

| EXAMPLE | PRIMARY ODOMETER | ENGINE HOURS | ESTIMATED MILEAGE (ENGINE HOURS × 50 MPH) | DISTANCE SINCE MIL | DISTANCE SINCE DTC CLEAR | SECONDARY ODOMETER (PID $0XA6) | ROUTINE MILEAGE (PID $0X31) | RAW EEPROM MILEAGE | KEY USAGE MILEAGE | ECM MILEAGE | CRASH EVENT MILEAGE | INFOTAINMENT MILEAGE | GATEWAY PROGRAMMING MILEAGE | FRAUD DETERMINATION | CONFIDENCE LEVEL |
|---|---|---|---|---|---|---|---|---|---|---|---|---|---|---|---|
| EXAMPLE1 (TAMPERED) | 50000 | 2000 | 100000 | 6000 | 5500 | 70000 | 75000 | 72000 | 68000 | 100000 | 80000 | 72000 | 71000 | TAMPERED | HIGH (~100 %) |
| EXAMPLE2 (NO INDICATIONOF TAMPERING) | 90000 | 1840 | 92000 | 2000 | 1500 | 90000 | 91000 | 90500 | 90000 | 92000 | 90000 | 90000 | 90000 | NO TAMPERING INDICATORS TRIGGERED | HIGH (~100 %) |
| EXAMPLE3 (BORDERLINE) | 70000 | 1500 | 75000 | 3000 | 2500 | 73000 | 74000 | 72000 | 70000 | 75000 | 70000 | 70500 | 70000 | BORDERLINE | MODERATE (40-60 %) |

FIG. 5

VIN-to-ECU Mileage Data Mapping Table

| VIN (Example) | Make/Model | Relevant ECUs | Mileage Data Type | Usage or Calculation Method |
|---|---|---|---|---|
| 1HGCM82633A004352 | Honda Accord 2003 | ECM, BCM | Engine runtime, trip data | Estimate mileage via engine hours × average speed |
| 1FTFW1ET1EKF51234 | Ford F-150 2014 | ECM, TCM, ABS | Engine hours, brake usage | Cross-reference hours with typical driving profiles |
| WDBUF56X18B123456 | Mercedes E350 2008 | ECM, Infotainment | Fuel consumption, GPS trip logs | Calculate from GPS distance or fuel use × efficiency |
| 3VW2B7AJ5EM123456 | Volkswagen Jetta 2014 | ECM, Gateway | Crash mileage logs, module event history | Compare stored event mileage to current odometer |
| JH4CL96806C123456 | Acura TSX 2006 | ECM, TCM | Shift count, engine runtime | Infer distance from gear usage and runtime data |

FIG. 7

SYSTEM AND METHOD FOR DETECTING ODOMETER TAMPERING USING ON-BOARD VEHICLE DIAGNOSTIC DATA

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure is directed to a vehicle diagnostics and electronic data verification system for use in monitoring or analyzing automotive performance and integrity. The disclosure is more particularly directed to a system and method for verifying odometer accuracy by comparing mileage data obtained from multiple electronic control units (ECUs) and diagnostic sources through the vehicle's Data-Link Connector (DLC) port, to detect potential odometer tampering or discrepancies.

2. Description of the Related Art

Odometers are a longstanding and essential feature of motor vehicles, providing a cumulative measurement of the total distance a vehicle has traveled during its operational life. This information is relied upon for a variety of critical purposes, including but not limited to determining routine maintenance intervals, calculating depreciation, assessing warranty eligibility, evaluating resale value, and supporting regulatory or insurance-related reporting. Because mileage directly influences a vehicle's marketability and perceived condition, the accuracy and integrity of odometer readings are of significant concern to manufacturers, service providers, regulatory agencies, and consumers alike. It is to be understood that mileage, as used herein, refers to kilometers as well, or any suitable measurement of distance travelled in any suitable unit of measurement.

In modern vehicles, the odometer is typically implemented as a digital subsystem within the instrument cluster. Vehicle speed information is gathered by sensors and processed by the vehicle's electronic systems to calculate the distance traveled. This accumulated mileage is stored in non-volatile memory and displayed to the driver via the dashboard. The transition from mechanical to digital odometers has provided benefits in terms of accuracy, reliability, and resistance to physical wear. However, it has also introduced new vectors for unauthorized manipulation.

Digital odometers, while more robust in construction, may be vulnerable to tampering through software or hardware-level interventions. In certain cases, mileage data may be reprogrammed, altered, or reset by accessing the electronic memory in which it is stored. Various tools, ranging from dealership-grade diagnostic equipment to aftermarket devices, can be used to read or modify this stored value, depending on the level of access and security measures in place. While some manufacturers have introduced encryption, secure bootloaders, and other protective mechanisms, these safeguards are not universally implemented, and their effectiveness varies across makes, models, and production years.

At present, the odometer reading as displayed on the instrument cluster is commonly accepted as the authoritative representation of a vehicle's accumulated mileage. Most diagnostic procedures, inspections, and ownership assessments rely on this value alone when evaluating a vehicle's usage history. However, in scenarios where odometer tampering has occurred, reliance on a single reported value, without further verification, may result in inaccurate assessments and undetected fraud. Despite advancements in digital security and diagnostic capabilities, there remains a need for improved methodologies to assess the accuracy of odometer readings in modern vehicles.

Modern vehicles incorporate a wide array of electronic systems designed to monitor, control, and report on various aspects of vehicle operation. Central to this capability is the On-Board Diagnostics (OBD) system, which enables communication between a diagnostic tool and the vehicle's internal network of Electronic Control Units (ECUs).

OBD systems were developed to monitor and report the status of a vehicle's engine and emissions systems. The earliest versions emerged in the 1980s, when automakers began installing simple electronic systems that could detect basic faults and illuminate a warning light, commonly known as the "Check Engine" light. These early systems were manufacturer-specific, with no standardized communication protocols or diagnostic connectors.

Evolution toward standardization began in the early 1990s with the introduction of OBD-I, which provided limited diagnostic capability and varied widely between manufacturers. In response to growing environmental regulations and the need for universal emissions monitoring, the U.S. government mandated a standardized system, OBD-II, starting with model year 1996 vehicles. OBD-II introduced a universal diagnostic connector and a common set of protocols for retrieving real-time and stored data from the vehicle's ECUs. Over time, OBD systems expanded to cover more vehicle subsystems, and global adoption followed through variants like EOBD (Europe) and JOBD (Japan). Today, OBD-II remains the foundation for automotive diagnostics, emissions compliance, and increasingly, data-driven vehicle analysis The OBD-II standard defines a 16-pin standardized diagnostic connector (commonly located under the dashboard), a set of communication protocols (including ISO 9141-2, SAE J1850 VPW/PWM, ISO 14230-4, and ISO 15765-4 CAN), and a suite of diagnostic services that allow external tools to interact with the vehicle. These services include reading live data from sensors, retrieving diagnostic trouble codes (DTCs), and in some cases, accessing stored values such as fuel system status, throttle position, and vehicle speed. A PID, or Parameter ID, is a numeric code used by diagnostic tools to request specific types of vehicle data from an ECU via the vehicle's OBD-II system. Each PID corresponds to a particular piece of information the ECU can report, such as engine RPM, vehicle speed, fuel pressure, or system voltage.

When a diagnostic scanner connects to the vehicle through the DLC port, it sends a command that includes a mode (which defines the type of operation, like reading live data or trouble codes) and a PID (which identifies the specific data point requested). The ECU responds with raw data that the scanner decodes into human-readable form.

PIDs are used to retrieve both standardized data (defined by the OBD-II protocol and supported across all vehicles)

and manufacturer-specific data, which may include proprietary PIDs not published publicly. These manufacturer-specific PIDs are often used to access deeper diagnostic or internal system values, including certain odometer-related information, internal mileage counters, or sensor calibration values.

In essence, a PID acts as a data address within the vehicle's electronic systems, allowing scanners to selectively extract operational or stored information from the network of ECUs. The system supports both generic PIDs (Parameter IDs), which are universally defined under SAE J1979, and manufacturer-specific or enhanced PIDs, which provide access to proprietary data not included in the public OBD-II standard.

DLC information is suitably obtained via a diagnostic scanner. The DLC port, typically located under the dashboard, initiates communication with onboard ECUs using a supported protocol. Once the physical connection and protocol negotiation are complete, the scanner sends requests formatted according to OBD-II standards or proprietary (OEM-specific) commands. Standardized requests use "modes" (like Mode 01 for real-time data or Mode 09 for vehicle information) and PIDs to request specific data, such as engine runtime, fuel status, or diagnostic trouble codes. The target ECU receives the request, processes it, and sends back a response containing the requested information in hexadecimal format, which the scanner decodes and displays in human-readable form.

In addition to standardized OBD-II requests, advanced diagnostic tools may access non-standard or manufacturer-specific PIDs, which involve proprietary services such as UDS (Unified Diagnostic Services) commands.

The entire process is session-based, with scanners often initiating a diagnostic session (e.g., default session, extended session) and managing response timing, error handling, and multi-frame data if large payloads are returned. Once data is retrieved, it may be logged, compared, or analyzed in real time or stored for offline fraud detection or diagnostics.

Current diagnostic methods used by service technicians, inspectors, or vehicle buyers typically rely on a single odometer value retrieved from the instrument cluster. Odometer information is a key data point used in vehicle servicing, resale, registration, insurance, and law enforcement investigations. Traditionally, the odometer reading is stored in the instrument cluster and presented to the driver via a digital or analog display. In many vehicles, the instrument cluster ECU is the primary or sole location where the vehicle's mileage is stored and accessed.

A challenge arises in the context of odometer fraud and tampering. Because the instrument cluster is often treated as the authoritative source for mileage data, it is also the primary target for tampering, whether by reprogramming, replacing, or manipulating the memory storing the odometer value. When this occurs, the value presented to buyers, service personnel, or inspectors may no longer reflect the vehicle's true usage. While anti-tamper features and cryptographic protections exist in some clusters, many vehicles still lack effective safeguards or can be compromised with relatively accessible tools.

Odometer manipulation, commonly referred to as odometer fraud or rollback, has existed for nearly as long as odometers themselves. In the earliest days of automobiles, odometers were purely mechanical, consisting of rotating drums or gears connected to the transmission or wheel hub. Fraud was straightforward and largely physical, dishonest sellers would disassemble the odometer and manually roll back the numeric dials, or they would run the vehicle in reverse for extended periods to decrement the reading. This process was time-consuming but required little technical knowledge and left minimal evidence if done carefully. As mechanical odometers became more refined, some manufacturers attempted to counter tampering by sealing housings or using tamper-evident screws, but these efforts did little to prevent skilled manipulation.

By the 1980s and 1990s, electromechanical odometers became common. These units still displayed numbers on physical wheels but were driven by electronic pulses rather than direct mechanical linkage. Vehicle speed sensors began to replace speedometer cables, and odometer readings were calculated electronically but still presented in a mechanical, numeric format. During this period, tampering techniques evolved to include the interception of electrical signals. Rollback could be accomplished using devices that interrupted or modified the pulse rate from the speed sensor, or by physically replacing the speedometer assembly with one from a vehicle with lower mileage. As memory chips began to store cumulative mileage internally, hackers learned to identify and desolder electrically erasable programmable read-only memory (EEPROM) chips, small non-volatile memory circuits containing odometer data, and reprogram them manually using specialized hardware. These techniques were more complex than those used on mechanical systems but remained accessible to individuals with a basic understanding of electronics.

With the rise of fully digital odometers in the late 1990s and 2000s, mileage information was displayed on a digital screen and stored in electronic memory, typically within the instrument cluster's microcontroller. As this shift occurred, tampering moved away from physical manipulation and into the realm of software-based hacking. Rollback operations were now performed by connecting diagnostic tools to the vehicle's OBD-II port and issuing commands to overwrite or modify stored values. At first, this required access to expensive dealership tools or OEM-specific interfaces. However, over time, a black market emerged for inexpensive and often illegal rollback tools capable of accessing and editing odometer memory on a wide range of vehicle makes and models. These tools were frequently accompanied by software that could calculate checksums or encryption keys, making the reprogrammed mileage appear authentic to the vehicle's internal systems.

As manufacturers began implementing countermeasures, such as storing mileage in multiple modules, introducing cryptographic validation, and adding redundancy, tampering techniques became more sophisticated in response. Hackers adapted by identifying all modules that stored odometer data, such as the body control module (BCM), anti-lock braking system (ABS), and transmission control module (TCM), and modifying values in each to prevent detection. More advanced rollback tools developed automated routines to scan for and rewrite all known memory locations associated with mileage, often within minutes. In some vehicles, odometer values could be changed simply by swapping the instrument cluster with a unit from a lower-mileage vehicle, prompting manufacturers to develop Vehicle Identification Number (VIN) matching protocols to tie odometer data to a specific vehicle identity. A VIN is a unique, 17-character alphanumeric code assigned to every motor vehicle at the time of manufacture. It serves as the vehicle's fingerprint, providing standardized information about its origin, make, model, engine type, body style, year of manufacture, and assembly plant. The VIN is used for registration, insurance, recalls, theft recovery, and service tracking. It is typically found on the dashboard near the windshield, inside the driver's door frame, and embedded in vehicle records. VINs are globally standardized under ISO 3779 and regulated in the U.S. by the National Highway Traffic Safety Administration (NHTSA).

In recent years, online forums and video tutorials have made odometer hacking even more accessible. Users with little technical knowledge can purchase pre-configured rollback tools or download software packages that support multiple vehicle brands. Despite increasing regulatory pressure and legal penalties, enforcement remains difficult, particularly in private vehicle sales, cross-border transfers, or markets with weak inspection regimes. Meanwhile, high-end vehicles and commercial fleets have seen the emergence of more specialized tampering techniques, including custom firmware flashing and manipulation of vehicle gateway modules to block mileage updates altogether.

Today, odometer fraud has fully transitioned from a mechanical crime to an electronic one. While the tools have changed, the goal remains the same: to misrepresent a vehicle's true usage for financial gain. This evolution parallels the broader digital transformation of vehicle architecture, with each technological advancement creating both new protections and new vulnerabilities. The ongoing arms race between vehicle security systems and tampering techniques underscores the need for more robust verification strategies and access to independent mileage sources for reliable detection.

Compounding the problem is the reliance of most inspections and buyer assessments on the mileage displayed by the instrument cluster alone. In the absence of independent verification or comparison against service records, many tampered vehicles are sold without detection. This undermines consumer trust, inflates vehicle prices based on inaccurate information, and may even pose safety risks when deferred maintenance is missed due to falsified mileage.

Lawmakers and regulatory agencies in various countries have recognized the seriousness of odometer fraud and have enacted laws prohibiting it. However, enforcement remains difficult, particularly for imported or transferred vehicles, and prosecutions are relatively rare. Even in jurisdictions where periodic inspections are required, the tools and procedures used by inspectors may not be capable of identifying digital tampering unless it has been poorly executed.

Today, odometer rollback continues to be a widespread issue despite decades of technical and legal attempts to prevent it. While modern vehicles offer increasingly complex electronic systems, the methods for altering displayed mileage have adapted just as quickly. The continued prevalence of odometer fraud highlights the need for improved verification methods and a more comprehensive approach to ensuring the accuracy and authenticity of mileage data in modern automotive systems.

The average odometer rollback in cases of fraud typically ranges from 30,000 to 70,000 miles (48,000 to 113,000 kilometers), depending on the region, vehicle type, and resale strategy. This figure reflects the amount by which the odometer is commonly reduced to maximize resale value while staying within believable limits that do not raise suspicion.

According to a comprehensive study by the U.S. National Highway Traffic Safety Administration (NHTSA), the average rollback in documented fraud cases was around 40,000 miles, though this varied based on vehicle age and market conditions. Similar findings from Carfax, a major aggregator of vehicle title, service, and mileage records, indicate that rollback values frequently fall in the 30,000-to-50,000-mile range, especially in cars that are between 5 and 10 years old, where the difference in market value between higher- and lower-mileage vehicles is most pronounced.

In European markets, particularly in cross-border sales, rollback amounts tend to be even higher. A 2018 European Commission report found rollback averages between 50,000 and 100,000 kilometers (31,000 to 62,000 miles), with some exceeding 150,000 kilometers (93,000 miles) for high-mileage vehicles being sold into countries with weak verification systems. These are often performed on imported vehicles to match local buyer expectations or regulatory categories.

Fraudsters typically attempt to strike a balance between reducing the odometer enough to materially affect value, while not reducing it so drastically that the mileage appears inconsistent with the vehicle's visible condition or service history. For this reason, odometer rollbacks are often strategically calculated to place the vehicle just below common buyer thresholds, such as 100,000 miles in the U.S. or 150,000 kilometers in the EU, where price depreciation is steepest.

In summary, while rollback amounts can vary widely, the typical range centers around 30,000 to 70,000 miles, with higher amounts more common in vehicles that are older, imported, or sold in loosely regulated markets.

Odometer fraud introduces substantial and wide-ranging harm across the automotive ecosystem, affecting individual consumers, vehicle manufacturers, insurers, regulatory agencies, and the used vehicle market as a whole. While the act of mileage tampering may appear to be an isolated offense, its consequences ripple through multiple sectors, resulting in financial losses, safety risks, legal complications, and market distortions.

At the most direct level, odometer fraud deceives buyers into overpaying for vehicles that have endured significantly more wear than advertised. Because vehicle mileage is a core determinant of value in used vehicle pricing, even moderate discrepancies can lead to price inflation of several thousand dollars per transaction. Buyers who purchase rolled-back vehicles may unknowingly acquire units that are past critical service intervals for safety-related components such as brakes, suspension systems, or timing chains, increasing the likelihood of mechanical failure or accident. In many cases, consumers are unaware of the deception until long after the sale, when repair issues emerge or discrepancies surface in historical records, if they surface at all.

From an insurance perspective, inaccurate odometer readings can affect premium calculations, underwriting assessments, and claims decisions. Insurers often use mileage as a proxy for vehicle usage, risk exposure, and depreciation. A vehicle with artificially lowered mileage may be misclassified, leading to underpricing of premiums or approval of policies that would otherwise be flagged. In the event of a claim, especially involving total loss or diminished value, the misrepresented mileage can lead to inflated payouts, fraud investigations, or denial of coverage, each of which carries administrative and financial burdens.

Warranty fraud is another major consequence. Many manufacturer warranties, service contracts, and extended coverage plans are limited by mileage thresholds. Tampered odometers may enable vehicle owners or resellers to present ineligible vehicles as qualified, resulting in unauthorized claims and coverage extensions. When such cases are uncovered, manufacturers may face not only direct financial losses but also legal disputes, reputational damage, and strained customer relationships.

The damage extends to fleet management and leasing operations as well. Fleets that acquire vehicles based on resale value or lease return metrics are particularly vulnerable to inflated pricing or manipulated wear indicators. Tampered mileage affects depreciation schedules, contractual obligations, and residual value estimates, compromising the accuracy of financial modeling and asset tracking.

Beyond individual transactions, odometer fraud undermines the integrity of vehicle history reporting systems. Services that rely on mileage data to compile ownership records, resale value guides, and condition reports become compromised when fraudulent data is introduced. This diminishes the reliability of vehicle history databases used by consumers, dealers, and regulators, and creates a general atmosphere of mistrust in the used vehicle market.

Enforcement costs are also nontrivial. Investigating, proving, and prosecuting odometer fraud requires technical forensic expertise, access to manufacturer records, and coordinated legal action across jurisdictions. Law enforcement agencies, consumer protection bureaus, and motor vehicle departments are often under-resourced for such investigations, leading to low detection rates and limited deterrence. In some cases, cross-border vehicle transfers further complicate jurisdictional authority and data validation.

Cumulatively, the cost of odometer fraud is substantial. Industry estimates suggest that billions of dollars in vehicle value are distorted annually due to mileage tampering. The practice also erodes trust between buyers and sellers, inflates the cost of ownership for unsuspecting consumers, and forces automakers and insurers to adopt more expensive controls and verification processes to mitigate risk. Despite technological advances in vehicle electronics, the persistence of odometer fraud continues to impose financial and operational burdens on virtually every stakeholder in the automotive value chain.

Odometer fraud presents not only a financial and legal issue but also a significant risk to human life, vehicle safety, and public infrastructure. When a vehicle's mileage is fraudulently reduced, it misrepresents the actual wear and age of mechanical and safety-critical systems. As a result, vehicle owners and service technicians may delay or skip essential maintenance procedures, unknowingly operating vehicles that no longer meet safety standards or manufacturer guidelines.

Most vehicle manufacturers design maintenance schedules based on mileage intervals. Components such as timing belts, brake pads, suspension systems, and drivetrain elements are expected to be inspected, serviced, or replaced after specific distances. When odometer readings are altered, these service intervals may be missed, potentially leading to critical failures. For example, a worn timing belt that is not replaced on time can result in sudden engine failure, possibly while the vehicle is in motion. Similarly, neglected brake components may degrade to the point of reduced braking power or total failure, especially under emergency conditions.

Safety systems such as airbags, seatbelt tensioners, and crash sensors may also rely on mileage-based diagnostics or replacement intervals. In vehicles with altered mileage, these systems may be assumed to be within their operational life when, in fact, they have exceeded their designed lifespan. This may result in partial or complete failure of safety systems in the event of a collision. Components that are past their tested operational thresholds may not deploy correctly or may not deploy at all, increasing the likelihood of severe injury or fatality.

Tire degradation presents another area of concern. Tires age not only based on time but also through cumulative distance and heat cycles. Vehicles with tampered odometers may continue operating on tires that are unsafe due to high mileage wear, increasing the risk of blowouts or loss of control at highway speeds. Suspension components, steering linkages, and wheel bearings are also subject to wear based on actual use. They may become hazardous if assumed to be in good condition due to an inaccurate odometer reading.

In addition to mechanical risks, improper mileage reporting may contribute to fire hazards. Aged fuel lines, electrical wiring, and engine gaskets are typically replaced or inspected based on cumulative vehicle operation data, such as mileage-related service intervals. If these parts are not serviced at the appropriate time, they may become points of failure that could result in leaks, shorts, or fires. In extreme cases, tampered vehicles have been associated with vehicle fires causing damage not only to the vehicle but also to nearby property, such as residential garages or parking structures.

Public safety is further affected when tampered vehicles circulate through the used car market or are imported and resold across jurisdictions. Vehicles with unknown or falsified mileage histories may escape mandatory inspections, safety recalls, or emissions testing, particularly when enforcement agencies lack accurate historical data. This may lead to unsafe vehicles operating on public roads without detection.

As modern vehicles become more complex and more dependent on mileage-driven service schedules, the consequences of odometer tampering become increasingly severe. The risks extend beyond financial harm and affect the physical safety of vehicle occupants, other drivers, and surrounding property. Despite technological advancements in vehicle electronics and digital odometer storage, tampering methods have continued to evolve, and reliable, consistent verification of mileage integrity remains a challenge in the current state of vehicle diagnostics and inspection.

Numerous government agencies, consumer protection organizations, and industry analysts have studied the scope, impact, and persistence of odometer fraud in both domestic and international vehicle markets. In a landmark report, the United States Department of Transportation's National Highway Traffic Safety Administration (NHTSA) estimated that more than 450,000 vehicles were sold each year in the United States with falsified odometer readings, resulting in over one billion dollars in annual consumer losses. That study, which analyzed data from law enforcement investigations and service records, noted that odometer tampering was most prevalent in vehicles between five and eleven years old, typically those with enough age and wear to justify a rollback, but still new enough to command higher resale prices. The report concluded that odometer fraud was both widespread and difficult to detect, due in part to the increasing sophistication of digital tampering tools and the lack of consistent verification procedures during vehicle resale.

Private vehicle history providers have echoed these findings. Carfax estimated that over one million vehicles currently on U.S. roads have suspect or altered odometer readings. The company has warned that odometer fraud continues to evolve in the digital era, with tampering now performed through access to memory chips or diagnostic interfaces rather than physical manipulation. Vehicles that pass through multiple owners or are transferred across state lines are particularly vulnerable, as differences in title reporting systems and inspection requirements can allow tampered vehicles to go unnoticed. Carfax and other industry sources have expressed concern that odometer fraud remains significantly underreported, with many cases going undetected by consumers and regulators alike.

At the international level, the European Commission conducted a comprehensive study on odometer manipulation across the European Union. It found that between 5 and 12 percent of vehicles in domestic markets, and as many as 30 to 50 percent of vehicles sold across national borders within the EU, had experienced mileage tampering. The report estimated the total economic damage across the region to be between €5.6 and €9.6 billion annually. It identified several key risk factors, including the lack of centralized mileage tracking databases and differences in enforcement practices across member states. The study recommended stronger cross-border data sharing, the introduction of tamper-resistant mileage recording systems, and the implementation of regulatory mechanisms to improve transparency during vehicle transfers.

Insurance and safety organizations have also raised concerns about the broader impact of odometer fraud. The Insurance Institute for Highway Safety (IIHS) has reported that vehicle age and condition are significant predictors of accident severity and repair cost, and that maintenance delays resulting from mileage misrepresentation can contribute to increased claim frequency and payout levels. When vehicle mileage is falsified, insurers may underwrite policies based on inaccurate risk assumptions, resulting in financial exposure or denial of claims. Similarly, the U.S. Government Accountability Office (GAO) has documented the difficulty of enforcing odometer laws at the federal level, particularly when state title records are incomplete, inconsistent, or outdated. The GAO noted that digital odometers, though more durable, had become targets of a new generation of fraud tools that exploit gaps in vehicle software security.

Automotive valuation services such as Kelley Blue Book and Edmunds have also quantified the economic distortion caused by odometer fraud. Their pricing models show that even modest mileage discrepancies can inflate a vehicle's perceived value by hundreds or thousands of dollars, depending on make, model, and market conditions. Because mileage is a central factor in used vehicle appraisal, any manipulation can significantly alter the financial dynamics of a transaction, disadvantage buyers who lack the tools to independently verify mileage integrity.

Taken together, these studies demonstrate that odometer fraud is not only persistent but evolving. While early instances involved mechanical rollbacks, modern fraud is often digital, fast, and difficult to detect without specialized tools. The impact spans multiple sectors, including consumer finance, vehicle safety, warranty administration, insurance underwriting, and regulatory oversight. Despite increased awareness and legal prohibitions, existing systems remain vulnerable to exploitation, and reliable methods for verifying vehicle mileage continue to be limited or unavailable to most end users.

Professional odometer tampering analyses are typically engaged on a case-by-case basis rather than routinely. They are most often initiated when there is a clear indication or suspicion of fraud. For instance, if a vehicle's service history, inspection records, or visual condition raises questions about the accuracy of its reported mileage during a pre-purchase inspection or resale transaction, a professional forensic analysis may be commissioned. Similarly, insurance companies or law enforcement agencies may call in specialists when investigating claims or legal cases involving potential odometer rollback.

In many instances, used car dealerships, independent inspectors, or state inspection agencies will flag vehicles with significant mileage discrepancies during routine checks. When these discrepancies are detected, whether through a mismatch between documented service records and the odometer reading or through advanced diagnostics using OBD-II tools, the vehicle may be sent to a specialized laboratory for further analysis. The frequency of such engagements depends on the market, regulatory environment, and the level of consumer protection enforced in a region. In markets with robust oversight and higher awareness of odometer fraud, these professional investigations are relatively more common, whereas in less regulated areas, they occur less frequently.

BRIEF SUMMARY

In accordance with an example embodiment of the present disclosure, an electronic diagnostic system detects odometer tampering by analyzing mileage data from multiple electronic control units (ECUs) within a vehicle. The system includes a diagnostic interface to receive onboard diagnostic data and a controller comprising a processor and memory. The controller is programmed to identify one or more ECUs that store cumulative vehicle operation data from which mileage can be inferred, such as from a body control module (BCM), engine control module (ECM), or other modules, based on a retrieved vehicle identification number (VIN). It then retrieves mileage-related values from those ECUs, compares them to a primary odometer reading, and generates a discrepancy alert if inconsistencies are found.

In some configurations, the retrieved data includes manufacturer-specific information accessible through non-standard parameter identifiers (PIDs), enhancing the system's ability to detect tampering even where standard OBD-II data is not sufficient. The system may also retrieve historical mileage logs from a cloud server associated with the vehicle's VIN and factor that information into the discrepancy analysis.

The controller may compute a fraud confidence score based on the number and consistency of values retrieved from internal and external sources relative to the primary odometer value. A classification of "pass," "questionable," or "tampering suspected" may then be generated depending on predefined criteria. The system can operate autonomously upon connection to a vehicle's diagnostic port and, in some configurations, display results and associated confidence scores to the user.

A related method establishes data communication with a vehicle, retrieves the primary odometer value, identifies at least two ECUs likely to store secondary mileage data using the VIN, retrieves that data, and compares it to the primary reading. If the difference exceeds a threshold (e.g., 100 kilometers or 60 miles), a tampering flag is generated. The method optionally retrieves mileage data from the BCM and ABS modules, cloud-based records, or other secondary sources. The classification of the result may be based on consistency and reliability across those sources.

Software instructions may be stored on a non-transitory computer-readable medium and, when executed, cause the system to retrieve and compare odometer-related values, generate classifications, and incorporate cloud-based historical data and confidence scoring models. These models weigh consistency across various sources, including manufacturer-specific PIDs and gateway-stored programming snapshots. If a deviation from the primary odometer value exceeds the threshold, the system outputs a tampering alert.

Another example embodiment analyzes mileage data from multiple data sources on a vehicle's internal data network, rather than just ECUs. The diagnostic system includes a processor that retrieves source data, derives multiple independent mileage estimates, and compares each to the primary odometer reading. If inconsistencies are detected, the system generates an alert. The VIN may be used to determine available data sources, which can include the BCM, ABS, TCM, ECM, or gateway module. In some versions, this determination is made in conjunction with a cloud server, and the system retrieves VIN data automatically upon connection.

BRIEF DESCRIPTION OF THE DRAWINGS

These and other features and advantages of the various embodiments disclosed herein will be better understood with respect to the following description and drawings, in which:

FIG. 3 is a table summarizing standard OBD-II information usable for odometer verification;

FIG. 4 is a table summarizing non-standard OBD-II information usable for odometer verification;

FIG. 5 is a table of example use cases showing whether or not tampering, or borderline odometer tampering is found;

FIG. 7 illustrates a table of example VIN-to-ECU mapping wherein ECUs that have alternative odometer PID information from which vehicle mileage may be found, inferred or calculated are identified for specific vehicles.

DETAILED DESCRIPTION

Figure 1:
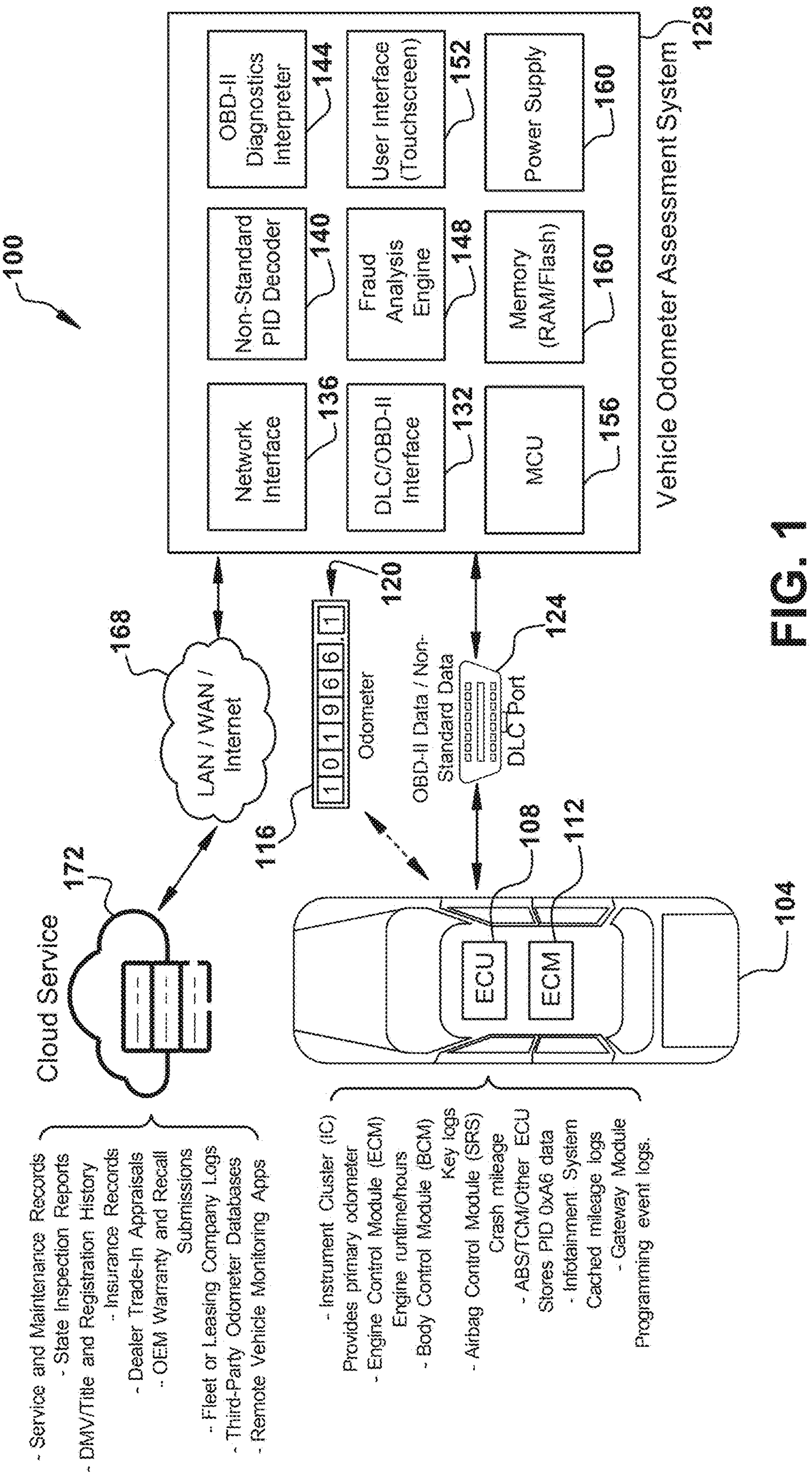
FIG. 1 is a schematic block diagram of an example embodiment of an operating environment for a system for detecting odometer tampering using on-board vehicle diagnostic data

The detailed description set forth below in connection with the appended drawings is intended as a description of certain embodiments of a vehicle diagnostic system and related method and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual relationship or order between such entities.

Example embodiments disclosed herein provide a tool to determine whether an odometer was rolled back relying on information obtained from a vehicle DLC port. Such information includes standardized OBD-II data, as well as information obtained from unique or specialized ECU queries.

In one example embodiment, the electronic diagnostic system includes a diagnostic interface configured to establish communication with a vehicle's electrical data network. Upon connection, the system's onboard controller, comprising a processor and associated memory, is programmed to identify various onboard sources of operational data that are accessible through the data network. These sources may include electronic control units (ECUs) as well as other modules such as instrument clusters, gateway controllers, or infotainment systems that store or generate data relevant to vehicle mileage.

In this embodiment, the controller retrieves data such as engine runtime, engine hours, fuel consumption, or other vehicle operation metrics from the identified data sources. It processes this data to derive multiple independent mileage values, using internal conversion logic that may be based on stored formulas or calibration profiles. Each derived mileage value is then compared to a primary odometer value obtained directly from an instrument cluster or an ECU known to contain odometer records. If any of the derived values differ from the primary odometer reading by more than a stored threshold, the system generates a discrepancy alert to flag potential odometer tampering.

In another embodiment, the system retrieves the cumulative vehicle operation data specifically from a plurality of ECUs, including one or more of a body control module (BCM), anti-lock braking system (ABS) module, transmission control module (TCM), gateway module, or engine control module (ECM). These ECUs may store data such as braking events, transmission shift logs, or engine control activity, which can be analyzed to estimate vehicle usage or distance traveled.

In a further embodiment, the controller retrieves vehicle identification information (e.g., vehicle identification number or VIN) via the diagnostic interface. This vehicle ID information is used to query a lookup table or onboard profile database to determine which of the available onboard modules are known to store mileage-related information for that specific vehicle make, model, and year. Once identified, the controller accesses the modules and retrieves the applicable data sets.

In yet another embodiment, the controller is configured to autonomously initiate the retrieval of vehicle identification information as soon as communication is established with the vehicle electrical network. This enables a streamlined process in which the system automatically identifies applicable data sources without requiring manual input or prior configuration.

In an extended embodiment, the diagnostic system is further connected to a cloud server that maintains a registry or database of vehicle-specific diagnostic profiles. Upon identifying the vehicle by its VIN or other identifiers, the controller queries the cloud server to obtain a list of known modules and data points relevant for that vehicle. This allows the system to determine with high confidence which data sources should be accessed to perform the mileage derivation and comparison analysis.

FIG. 1 is a schematic block diagram 100 of an example embodiment of an operating environment for a system for detecting odometer tampering using on-board vehicle diagnostic data. Vehicle 104 includes Electronic Control Unit (ECU) 108 and Engine Control Module (ECM) 112. In modern vehicles, ECU refers broadly to any embedded computer system that controls or monitors specific functions. A vehicle may contain dozens of ECUs, each dedicated to a different system or subsystem. These include modules such as the TCM, BCM, ABS ECU, Airbag or Supplemental Restraint System (SRS) ECU, Infotainment ECU, and the Central Gateway Module. Many of these ECUs independently record operational data, such as key usage history, crash-event mileage, cached odometer snapshots, and secondary lifetime mileage values, which can be accessed using manufacturer-specific diagnostic commands.

These independent ECUs serve as crucial sources of corroborating information when verifying the integrity of the vehicle's odometer reading.

The ECM is a specific type of ECU dedicated to managing and monitoring engine performance. It typically controls functions such as fuel injection, ignition timing, emissions control, and idle speed. Importantly, the ECM often stores detailed operational history including engine runtime and total engine hours, information that can be used to calculate an estimated vehicle mileage independently of the primary odometer. The ECM is also commonly involved in responding to manufacturer-specific service routines, such as those triggered by diagnostic PID $0x31, which can return lifecycle counters or internal mileage estimates. As such, the ECM serves as both a central node in standard OBD-II diagnostics and a key source of independent data for odometer verification.

The ECU or ECM can provide several pieces of information relevant to odometer tampering detection, even though it may not store the odometer reading itself in a directly readable format. One of the most valuable data points is the total engine runtime, which may be stored in seconds (via Mode 01 PID 1F) or in hours through a manufacturer-specific PID or UDS command. This runtime can be used to estimate overall vehicle mileage by applying a reasonable average driving speed. Additionally, the ECM may store counters such as fuel consumption, ignition cycles, and diagnostic event logs, each of which can offer indirect clues about how much the vehicle has been driven. Some ECMs may also support PID $0x31, which invokes internal routines that can return lifecycle or usage metrics that are not normally reset, even when the odometer is rolled back. These values are less likely to be altered by casual tampering because they are stored in protected memory areas or require manufacturer-specific tools to access or change. As such, the ECM is a critical source of supporting data that, while not providing a direct odometer value, can help flag discrepancies and support a tampering determination when compared to the displayed mileage.

Vehicle 104 includes an odometer 116 which typically displays an apparent value of miles and/or kilometers 120 travelled by vehicle 104. Vehicle 104 also includes DLC port 124 facilitating data communication with vehicle odometer assessment system (VOAS) 128 via DLC/OBD-II interface 132. Such information suitably includes the vehicle VIN 134, standard OBD data, as well as non-standard data. VOAS 128 includes network interface 136, non-standard PID decoder 140, OBD-II diagnostics interpreter 144, fraud analysis engine 148, user interface 152, suitably a touchscreen, microcontroller unit (MCU) 156, volatile/non-volatile data storage, such as memory 160 and an internal or external power supply 164. VOAS 128 is in data communication with network cloud 168 via network interface 136. Network cloud 168 is suitably comprised of any wireless or wired data transmission medium and may comprise one or more local area network (LAN) or wide-area network (WAN) which may comprise the Internet. Cloud service 172 is also in data communication with network cloud 168, facilitating data communication between VOAS 128 and cloud service 172.

Cloud service 172 is suitably integrated with an odometer verification system configured to store a wide range of data types that can support or enhance the detection of odometer tampering. This includes VIN-to-ECU mapping information suitable to determine which ECUs for a particular vehicle may have information from which vehicle mileage can be calculated or inferred. Cloud service data further includes historical odometer readings collected during vehicle service visits, emissions inspections, lease or warranty repairs, and insurance claims. Telematics data, particularly from connected vehicles or fleet systems, may record ongoing mileage logs, engine hours, GPS-based distance tracking, and timestamps, all of which can be cross-referenced against the current odometer reading. Cloud storage may also include vehicle configuration logs, firmware update history, and digital records of ECU programming or key initialization events, any of which could reflect the odometer value at the time. Some systems may track diagnostic scan sessions, capturing stored data snapshots or maintenance intervals that indirectly verify usage patterns. In addition, digital service histories, such as those maintained by manufacturers, dealerships, or third-party platforms, can store verified mileage records that serve as checkpoints over time. All of this cloud-stored information becomes useful for triangulating mileage consistency and detecting rollbacks when local ECU or cluster data appears suspicious or incomplete.

Cloud service 172 also suitably provides support in obtaining and interpreting DTCs and other vehicle data retrieved through the DLC. This includes access to comprehensive DTC code libraries that provide definitions, severity levels, and recommended diagnostic or repair steps for both generic and manufacturer-specific codes. Such resources help ensure accurate interpretation of raw codes retrieved during a scan. Cloud-based systems may also maintain vehicle-specific protocol mappings, including information on non-standard or proprietary PIDs, communication formats, and security access levels required to interface with certain ECUs, particularly helpful when dealing with OEM-specific data or advanced diagnostics like UDS routines. Additionally, the cloud can provide real-time lookup services to identify applicable service bulletins, recall information, or known issues linked to specific DTCs. In more advanced implementations, the cloud may even store past DTC histories for the same vehicle, allowing for trend analysis, verification of previous resets or tampering attempts, and confirmation of whether codes were cleared prematurely. By supplementing local scan tool capabilities with centralized, frequently updated data, the cloud becomes a powerful tool for interpreting DLC data with greater accuracy, context, and vehicle-specific relevance.

Figure 2:
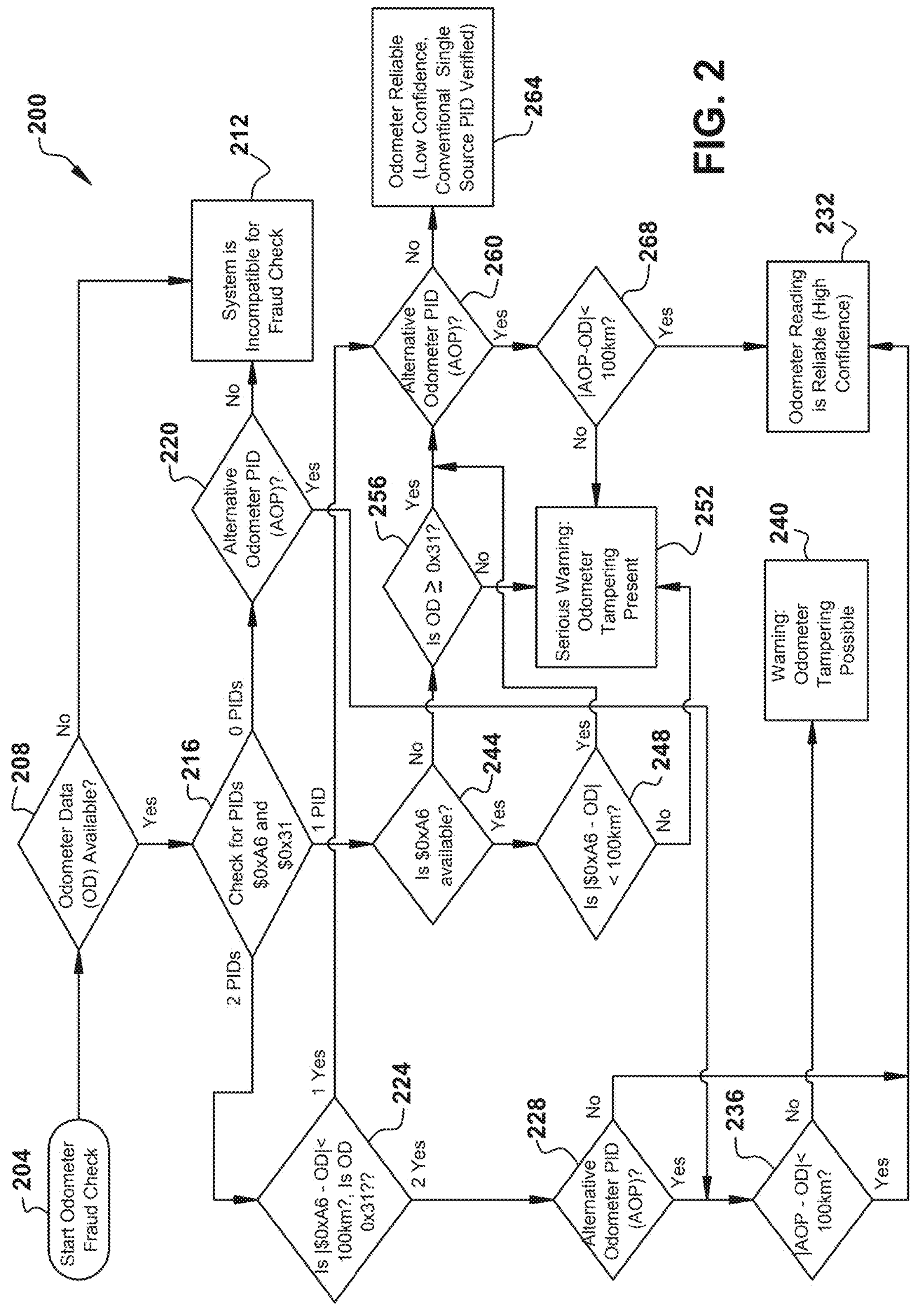
FIG. 2 is a flowchart of an example embodiment an example embodiment of a system for detecting odometer tampering using on-board vehicle diagnostic data.

FIG. 2 illustrates flowchart 200 an example embodiment an example embodiment of a system for detecting odometer tampering using on-board vehicle diagnostic data. This example uses 1, 2 or 3 PIDs to secure odometer information for verification. These include PIDs $0xA6, $0x31 and alternative odometer information that may be available in select vehicles.

PID $0x31 is associated with UDS service 0x31 (Routine Control). This service allows a diagnostic tool to trigger predefined routines within an ECU and receive structured results. In some vehicles, PID $0x31 is used to request an internal mileage readout or lifecycle counter from an ECU, such as a TCM or BCM, which does not respond to direct data identifiers. Unlike simple memory reads, routine control PIDs can return formatted values validated by the ECU, reducing the likelihood of false interpretations. These routines may be used in dealership service software to cross-verify mileage or assess wear-related values stored in non-public memory blocks.

A summary of data obtainable via PIDs $0xA6 and $0X31 appears below.

Information Obtainable from PID $0xA6 and PID $0x31

| PID | Data Type | Typical Source Module | Access Method | Purpose | Notes |
|---|---|---|---|---|---|
| $0xA6 | Secondary Odometer/ Lifetime Mileage Counter | ABS, BCM, TCM, or other ECU | Service $01 (ReadDataByIdentifier) | Cross-check against primary odometer | Stores independent mileage not easily altered via cluster reprogramming |
| $0x31 | Routine-Controlled Mileage or Lifecycle Counter | ECM, TCM, Gateway ECU | Service $01 (RoutineControl) | Invoke diagnostic routine to retrieve mileage-related values | Depends heavily on OEM implementation; may return engine life, wear counters, or internal mileage |

PIDs $0xA6 and $0x31 are useful tools for detecting potential odometer tampering because they retrieve mileage-related data from internal vehicle systems that are often overlooked during fraudulent rollback attempts. PID $0xA6 typically returns a secondary or lifetime mileage value stored in a non-cluster ECU, such as the ABS, BCM, or transmission module. This value is often not reset when the instrument cluster is reprogrammed, making it a relatively reliable point of comparison for verifying odometer consistency. Its reliability is moderate, it is more difficult to manipulate than the main odometer display, but it is still vulnerable to advanced reprogramming tools if a fraudster knows where to look.

PID $0x31, on the other hand, is used to invoke a diagnostic routine that returns a counter, such as mileage, engine hours, or internal lifecycle data, from an ECU, typically the ECM or another drivetrain controller. This data is often calculated independently from the odometer and may reflect cumulative vehicle usage in a less obvious format. Its reliability is also moderate to high, depending on how securely the ECU stores and reports this information. Both PIDs, while not immune to tampering, provide valuable secondary data points that can expose inconsistencies when compared to the displayed odometer. They are particularly useful when used together or in conjunction with alternative odometer data stored in other ECUs.

A significant portion of modern vehicles, particularly those manufactured from around 2012 onward, contain alternative odometer information that can be accessed through the DLC, even outside of the standard PIDs such as $0xA6 and $0x31. These alternative mileage values are typically stored in ECUs like the BCM, ABS module, Gateway module, TCM, or infotainment system. The data is often stored as a directly readable value and may serve as a backup or event log related to system synchronization, key programming, or firmware updates. Accessing these values generally requires enhanced diagnostic routines, such as UDS-based ReadDataByIdentifier commands or manufacturer-specific protocols.

It is estimated that approximately 30 to 50 percent of vehicles from model years 2012 and newer support at least one of these alternative mileage values that can be retrieved through the DLC using professional-grade or OEM-level scan tools. Vehicles manufactured before this period are far less likely to contain DLC-accessible alternative mileage data, with support likely falling below 20 percent. Among newer vehicles, the availability of this information is more common in mid-range to premium models, and particularly prevalent in brands such as Volkswagen, BMW, Mercedes-Benz, Toyota, Honda, Hyundai, and Kia. Although the data is not standardized across manufacturers, it is used, when available, in the example embodiment of FIG. 2 to verify odometer integrity when more common PIDs are missing or inconsistent.

This additional odometer information is particularly effective in detecting odometer tampering in the very vehicles that are most susceptible to such fraud. Vehicles that are commonly targeted for odometer rollback, such as high-value European models, popular Japanese sedans, and high-demand fleet vehicles, are also the ones most likely to store redundant odometer-related data in multiple ECUs. These vehicles often contain alternative odometer values in modules like the BCM, ABS), Gateway Module, TCM), or infotainment system. Because these alternative values are frequently overlooked or left unchanged during fraudulent rollback attempts, they serve as highly effective secondary verification points in vehicles that need them most.

European luxury brands like BMW, Mercedes-Benz, Audi, and Volkswagen are frequent targets of odometer fraud due to their strong resale value and the widespread availability of rollback tools tailored specifically to these platforms. Similarly, Japanese vehicles such as Toyota, Honda, and Lexus are common in used car markets where mileage manipulation is prevalent, especially in export or lease-return contexts. Many of these vehicles store mileage data in more than one ECU, but lack strong protections across all modules, making them vulnerable to partial or incomplete tampering efforts. While these vehicles are more at risk, they are also better suited for a fraud detection system that compares multiple internal mileage sources.

The subject system leverages this redundancy by querying not only standard PIDs such as $0xA6 and $0x31, but also alternative odometer values retrievable through the DLC from other ECUs. This approach increases the likelihood of detecting inconsistencies when only one part of the system, typically the instrument cluster, has been modified. In practice, this means the system performs best where fraud is most likely, yielding higher detection rates in the vehicles that present the greatest financial risk if tampering goes unnoticed.

The VOAS in the flowchart of FIG. 2 commences at block 204, suitably autonomously after the tool is connected to a vehicle's DLC port, and proceeds to block 208 where a determination is made as to whether electronic odometer data (OD) is available. If not, the system is incompatible and terminates at block 212. If OD is available, a check is made at block 216 for available information from PIDs $0xA6 or $0X31. If not, a check for available alternative odometer PID (AOP) information is made at block 220. AOP information is suitably determined to be available by checking the vehicle VIN to determine which ECUs are relevant for a particular vehicle make, model and year. If AOP information is not available, the systems is incompatible for verification and ends at block 212.

Although odometer tampering is most commonly associated with rolling back mileage to increase a vehicle's resale value, there are instances where tampering may actually result in increased mileage on the odometer. One common scenario involves replacing the instrument cluster with a used unit that has higher mileage than the original. If the new cluster is not reprogrammed to reflect the correct value, or if the vehicle's system defaults to the higher number as a safeguard against rollback, the displayed mileage will increase. This can happen during legitimate repairs if the technician does not synchronize the values correctly.

Another possibility involves user error or programming mistakes during mileage adjustment. Diagnostic tools or EEPROM programmers may be used improperly, especially when data formats or units are misinterpreted, leading to an accidental increase in the recorded mileage. In some rare cases, individuals may intentionally increase the odometer reading to meet lease contract requirements that penalize underuse, or to manipulate warranty terms by making a failure appear to have occurred outside the coverage period. There are also cases where added mileage is used to mask earlier rollback tampering, artificially restoring the odometer to a value that appears more realistic to avoid suspicion.

While adding mileage is far less common than reducing it, these cases demonstrate that odometer tampering is not always aimed at lowering the reading. A comprehensive detection system needs to account for both types of discrepancies, whether the odometer has been rolled back or rolled forward, as either condition may indicate manipulation or data inconsistency.

If alternative AOP information is available from both $0xA6 and $0x31, the system proceeds to block 228 where a difference between OD and $0xA6 values is checked relative to a selected tampering threshold, 100 km in illustrated example. If the OD shows 100 km or fewer miles than the $0xA6 value, odometer tampering is indicated. A absolute value of this difference is suitably used to additionally flag a possible roll forward. A test is also made as to whether the OD is greater than, or equal to, the value of $0x31. If so, no tampering is indicated.

If both PIDs fail to show tampering, the system proceeds to block 228 to determine if AOP information is available. If not, given that the two available indicators conclude no tampering, the process ends at block 232 indicating that the odometer is accurate with a relatively high degree of confidence. If AOP information exists, it is tested against the OD value at block 236 and the 100 kn threshold. If the difference is less, then the lack of tampering is further buttressed and the system proceeds to block 232. If the difference is more, there are two indicators of no tampering, and one of possible tampering. The system then proceeds to block 240 where it terminates with a warning of possible tampering.

Returning to block 220, where PIDs $0xA6 and $0x31 are absent, a determination that an AOP exists directs the process to block 236 for addressing as noted above. As this is now the only test relative to OD verification, confirmation of no tampering allows for progress to block 232. If tampering is indicated, the process proceeds to issue a warning at block 240.

If only one PID is determined to be available at block 216, a check is made to see which one at block 244. If it is $0xA6, a difference with OD is checked relative to the 100 km threshold at block 248. If the difference is greater than 100 km, a serious tampering warning is issued at block 252. If only $0x31 is available, it is tested at block 256 to determine if its value is less than OD. If not, the warning is issued at block 252.

If no tampering is indicated by block 248 or block 256, a test is made at block 260 to determine if AOP information is available if not, an indication off no tampering is indicated at block 264, albeit with a relatively low confidence as only one value was used to verify no tampering. If AOP information is available form block 260, the difference between the AOP value and 100 km threshold is determined at block. If the threshold is exceed, a warning is indicated at block 252. If not, the process terminates at block 232 with a high confidence determination of no odometer tampering.

Other example embodiments determine a likelihood of fraud tampering with additional available OBD information that is indirectly, as opposed to directly indicating an odometer value. Standardized OBD-II data, defined under the SAE J1979 protocol, may not include a direct parameter for total odometer mileage. However, several standardized data points accessible through the OBD-II interface can serve as indirect indicators of a vehicle's accumulated use and may support an estimate or inference about true mileage, especially when the displayed odometer is suspected of being altered. These parameters are available through Mode $01 (Show Current Data), Mode $09 (Vehicle Information), and in some cases, Mode $04 or $0A, depending on the vehicle.

One of the most useful standardized indicators is the engine runtime reported as the time since engine start (PID $1F). This value, while limited to the current drive cycle, can be compared to patterns over multiple observations to assess consistency. More telling is Mode $09 PID $0F, which reports engine hours since manufacture in some vehicles, this value is particularly common in Ford, GM, and some FCA vehicles. When combined with average driving speeds (either estimated or pulled from fuel economy logs), this can be used to estimate total mileage. For example, a vehicle with 5,000 engine hours and an average speed of 35 mph likely has over 175,000 miles, even if the odometer shows significantly less.

Another helpful data point is the distance traveled since the Malfunction Indicator Lamp (MIL) was last activated (Mode $01 PID $21). This value, reported in kilometers, shows how far the vehicle has traveled since the last time a fault code triggered the check engine light. If the displayed odometer shows lower mileage than this value alone, tampering is almost certain. Similarly, Mode $01 PID $31 provides the distance traveled since diagnostic trouble codes were last cleared, which may also be used as a baseline to compare against odometer claims. These values are particularly useful in identifying recent resets or intentional clearing of stored data to hide wear.

Fuel system metrics can also serve as indirect mileage indicators. PID $2F reports the fuel level, and when logged over time alongside PID $5E (fuel rate, if supported), a rough calculation of total fuel consumed can be performed. Combined with typical vehicle efficiency, this may support an estimate of how far the vehicle has traveled in its lifetime.

In addition, Mode $09 PID $02 provides the VIN, which allows users to retrieve vehicle-specific data from external sources (e.g., service records or historical mileage logs) that may corroborate or contradict onboard data.

While none of these standard parameters can independently confirm odometer mileage, they can collectively offer strong circumstantial evidence. When analyzed together, especially across multiple sessions or with support from manufacturer-specific data, they can help identify inconsistencies in the reported mileage and support a suspicion of odometer tampering.

If you combine all available standardized OBD-II data, including engine hours, distance since DTC clear, distance since MIL activation, fuel usage (if available), and other operational metrics, you can derive a reasonably accurate approximation of true vehicle mileage, but it will never be as precise as reading a true odometer register. The resulting estimate can be highly informative, particularly when evaluating suspected odometer fraud, but its accuracy depends on several assumptions and limitations.

In ideal cases, such as with certain Ford, GM, or FCA vehicles that report total engine hours via Mode $09, the derived estimate can be quite accurate. If the average driving speed for the vehicle is known or can be reasonably assumed (e.g., 30-40 mph for mixed-use vehicles, 55+ mph for highway-heavy use), multiplying engine hours by that average speed gives a usable mileage estimate. For example, a vehicle reporting 4,000 engine hours and a realistic average of 35 mph would likely have traveled about 140,000 miles. This estimate is typically accurate within ±10%, assuming consistent vehicle use and no extended idling (which would skew the ratio downward).

cleared, so they're only reliable for identifying minimum mileage traveled since the last reset event.

In vehicles that report fuel consumption rate (PID $5E) and total fuel used (via manufacturer-specific PIDs), it's also possible to estimate mileage by applying known or EPA-rated fuel economy values. For example, if a vehicle has consumed 5,000 gallons and the expected average fuel economy is 25 mpg, it has likely traveled 125,000 miles. This method is useful for commercial vehicles or long-haul trucks with diesel engines that report fuel metrics more consistently, but it becomes less accurate in passenger vehicles due to variable driving conditions and load profiles.

Using these various OBD-II values in combination allows for a cross-validated estimate that can be surprisingly effective at detecting fraud or confirming authenticity. While it won't give you a reading to the exact mile, a well-calculated estimate is typically accurate within ±10 to 15% under normal conditions. In cases of severe tampering, such as when the odometer has been rolled back tens of thousands of miles, the discrepancy between the calculated estimate and the displayed mileage is usually large enough to raise immediate concern.

In short, while standardized OBD-II data alone cannot provide an exact odometer reading, it can absolutely provide a defensible, data-supported mileage estimate that serves as a powerful tool in tampering detection and vehicle integrity assessment. When used in conjunction with external records or secondary ECU data, its reliability improves even further. A table summarizing standard OBD-II information usable for odometer verification is found in FIG. 3. Example pseudocode to acquire standard OBD-II related to odometer verification, suitably run on an MCU follows:

```
FUNCTION gatherStandardOBDData( ):
  // Establish connection to the vehicle's OBD-II port
  connection = openOBDConnection( )
  IF connection is NOT successful THEN:
    logError("Unable to connect to OBD-II port")
    RETURN error
  // Initialize a dictionary to store standard OBD-II data
  standardData = { }
  // Retrieve standard data using OBD-II commands:
  standardData["vin"] = sendOBDRequest(mode = 09, pid = 02)          // Vehicle Identification Number
  standardData["engineRuntimeSeconds"] = sendOBDRequest(mode = 01, pid = 1F) // Engine runtime in seconds
  standardData["distanceSinceMIL"] = sendOBDRequest(mode = 01, pid = 21)      // Distance traveled since MIL activation
  standardData["distanceSinceDTCclear"] = sendOBDRequest(mode = 01, pid = 31)  // Distance traveled since DTCs cleared
  standardData["engineHours"] = sendOBDRequest(mode = 09, pid = OF)      // Total engine run time in hours (if available)
  standardData["fuelRate"] = sendOBDRequest(mode = 01, pid = 5E)         // Fuel consumption rate (if available)
  standardData["primaryOdometer"] = sendOBDRequest(manufacturerSpecific = TRUE, parameter = "PrimaryOdometer") //
Primary odometer reading
  // Process engine runtime: if engineHours is not available, convert engineRuntimeSeconds to hours
  IF standardData["engineHours"] exists THEN:
    runtimeHours = standardData["engineHours"]
  ELSE:
    runtimeHours = standardData["engineRuntimeSeconds"] / 3600
  END IF
  // Estimate total mileage using an assumed average speed (AVERAGE_SPEED defined elsewhere)
  standardData["estimatedMileage"] = runtimeHours * AVERAGE_SPEED
  // Save or log the collected standard data
  logData(standardData)
  // Close the OBD-II connection
  closeOBDConnection(connection)
  RETURN standardData
END FUNCTION
```

If engine hours are not available, you can use other indicators such as the distance since DTC clear (Mode $01 PID $31) and distance since MIL activation (PID $21). These can't tell you total mileage, but if either one is higher than the vehicle's reported odometer, that's a definitive red flag. However, these values reset whenever codes are This function, gatherStandardOBDData, connects to the vehicle's OBD-II port and retrieves key standardized data. It collects the vehicle's VIN, engine runtime (in seconds), distance traveled since the MIL was activated, distance traveled since DTCs were cleared, total engine hours (if available), the fuel consumption rate, and the primary odometer reading. If engine hours are not directly available, the runtime in seconds is converted to hours. Using an assumed average speed (defined as AVERAGE_SPEED), the function calculates an estimated total mileage. All the data is stored in a dictionary named standardData, which is then logged and returned after closing the connection.

In this context, a finding of fraud, where the estimated mileage based on OBD-II data is clearly higher than the displayed odometer, is generally trustworthy. It is supported by multiple independent data points stored in the vehicle's modules, many of which are not altered by standard tampering tools. These findings are especially compelling when engine hours are available and can be paired with a reasonable average driving speed to calculate an estimated total mileage. The same is true when the stored distance since DTC clear or MIL activation is higher than the total shown on the odometer. These forms of evidence make it possible to detect tampering even when the odometer itself appears to be functioning normally.

However, a determination that no fraud has occurred, based solely on the absence of a detectable discrepancy, may not be accurate. In some cases, tampering may not leave traces in the standard OBD-II data, particularly if the rollback was small, if the diagnostic modules were recently reset, or if the vehicle does not support engine hour reporting. For example, if the DTC memory was recently cleared, the stored distance since code clear will no longer reflect true usage. If engine hours are unavailable, or if the driver frequently idles the vehicle or drives at very low speeds, the calculated mileage based on runtime may underestimate actual distance traveled. In other cases, more sophisticated tampering methods may involve modifying multiple ECUs, eliminating discrepancies between them and the instrument cluster.

Because of these limitations, a lack of detected fraud cannot be taken as proof that the odometer is accurate. The absence of evidence is not evidence of absence. For that reason, this method is most effective when used alongside other forms of verification, such as vehicle history reports, service records, or secondary mileage data retrieved from non-standard ECUs.

While a determination of fraud is unproven, a clean indirect odometer analysis, meaning no discrepancies found using available standard OBD-II data, can reasonably be interpreted as evidence that, if fraud did occur, it is less likely to be severe, costly, or dangerous. While it doesn't rule out tampering entirely, it suggests that any rollback is either minor in scale or well-aligned with the vehicle's overall use patterns, and therefore less likely to result in major safety, maintenance, or financial risks.

Severe rollbacks involving 30,000 miles or more often create detectable inconsistencies in diagnostic data. For example, a significant difference between the odometer reading and the number of engine hours (multiplied by a realistic average speed), or between the odometer and the distance since DTC or MIL reset, usually shows up clearly during even a basic enhanced OBD-II scan. These larger rollbacks are also more likely to affect critical service intervals, such as timing belt replacements, brake system overhauls, or airbag module inspections, which carry real mechanical and safety consequences if missed.

If none of the available OBD-II data shows anomalies, particularly when the vehicle supports engine hour reporting, runtime tracking, or historical distance counters, it means either no tampering occurred or that any tampering was relatively limited. For instance, if a rollback was only a few thousand miles, it might still be deceptive but would be less likely to cause premature part failure, safety system malfunction, or mislead the buyer about immediate service needs. In these cases, the financial impact may be lower, and the risk of a serious mechanical issue due to skipped maintenance is reduced.

However, it's important to remember that a clean OBD-II profile doesn't completely eliminate risk. Some vehicles don't store detailed operational history, and some tampering may target all modules storing mileage-related values. Still, in practical terms, the lack of discrepancies across several independently stored indicators, especially in vehicles that do report engine hours or cumulative distance, is a strong signal that the vehicle's usage history has not been grossly misrepresented. Therefore, while not proof of authenticity, it is indeed evidence that if fraud occurred, it is likely to be less severe in scope, less costly in effect, and less dangerous in terms of safety implications.

Indirect odometer analysis using standard OBD-II data is a highly effective method for detecting fraud in many cases, particularly when the odometer has been rolled back by the typical 30,000 and 70,000 miles. When diagnostic data such as engine hours, distance since the last DTC clear, or distance since MIL activation is available, these values can be compared to the vehicle's reported odometer reading. If they show that the vehicle has traveled significantly farther than what is displayed, that discrepancy is a strong and reliable indicator that odometer tampering has occurred.

Indirect odometer verification using standard OBD-II data is best understood as a tool for uncovering hidden discrepancies and identifying strong indicators of tampering. It is highly reliable when it does detect fraud but is not foolproof as a confirmation of odometer integrity. Additional reliability in odometer fraud detection can be obtained by additional data available through the vehicle DLC port.

Beyond standardized OBD-II data defined under SAE J1979, a wide range of non-standard, manufacturer-specific vehicle data can be accessed through the DLC using enhanced protocols. These data are not universally available across all vehicles but are suitably used by OEM scan tools to retrieve deeper information stored in various electronic control units (ECUs). These manufacturer-specific parameters are typically accessed through extended diagnostic sessions over the CAN bus using protocols such as ISO 14229 (UDS-Unified Diagnostic Services) or ISO 14230 (KWP2000), which allow for custom service identifiers, memory address reads, and routine control functions.

Additional non-standard data accessible via the DLC includes engine runtime hours, service interval counters, key usage logs, and event timestamps such as the mileage at which a fault code was set or reset. Many modern vehicles also support data blocks from gateway modules or vehicle central processors that maintain diagnostic access history, including odometer snapshots from past programming sessions. While this data is not part of the SAE-mandated OBD-II structure, it is fully accessible through the DLC using OEM diagnostic commands when the tool has appropriate access privileges and knowledge of the relevant identifiers.

These non-standard values provide a valuable tool in tamper detection and fraud analysis, as they often reside in modules untouched by basic rollback procedures. Because many aftermarket tools do not expose or decode this deeper data, it remains hidden from casual tampering but accessible to investigators or certified technicians equipped with the right software. Thus, the DLC port offers far more than standard OBD-II functionality when enhanced protocols and non-standard PIDs are used effectively. A table summarizing non-standard OBD-II information usable for odometer verification is found in FIG. 4. Example pseudocode to obtain non-standard DLC port data related to odometer information follows:

```
FUNCTION gatherNonStandardData( ):
  // Establish connection to the vehicle's DLC port
  connection = openOBDConnection( )
  IF connection is NOT successful THEN:
    logError("Unable to connect to DLC port")
    RETURN error
  // Initialize a dictionary to store non-standard data
  nsData = { }
  // Retrieve non-standard data using manufacturer-specific requests:
  nsData["secondaryOdometer"] = sendOEMRequest(pid = 0xA6, service = "ReadDataByIdentifier")
    // Secondary odometer reading from a non-instrument-cluster ECU (e.g., ABS, TCM, or BCM)
  nsData["routineMileage"] = sendOEMRequest(pid = 0x31, service = "RoutineControl")
    // Mileage value obtained by triggering a diagnostic routine
  nsData["rawEEPROMMileage"] = sendOEMMemoryRequest(address = "KnownAddress", length = "DataLength")
    // Raw mileage data directly from ECU EEPROM or flash memory
  nsData["keyUsageMileage"] = sendOEMRequest(module = "BCM", parameter = "KeyLogData")
    // Mileage logged for individual keys or user profiles
  nsData["ecmEngineHours"] = sendOEMRequest(pid = "OEM_ECM_Runtime", service = "ReadDataByIdentifier")
    // Engine hours from the ECM, convertible to mileage
  nsData["crashEventMileage"] = sendOEMRequest(module = "Airbag", parameter = "CrashMileage")
    // Mileage recorded at the time of a crash event (from the airbag/SRS module)
  nsData["infotainmentMileage"] = sendOEMRequest(module = "Infotainment", parameter = "CachedMileage")
    // Cached mileage stored by the infotainment system
  nsData["gatewayProgrammingMileage"] = sendOEMRequest(module = "Gateway", parameter = "ProgrammingMileage")
    // Mileage logged during ECU programming or key initialization events
  // Save or log the collected non-standard data
  saveData(nsData)
  // Close the DLC connection
  closeOBDConnection(connection)
  RETURN nsData
END FUNCTION
```

This function, gatherNonStandardData, is dedicated to retrieving manufacturer-specific (non-standard) odometer information from the vehicle's DLC port. It opens a connection and initializes a dictionary called nsData to store the values. The function then gathers several pieces of non-standard data: a secondary odometer reading (via PID 0xA6), routine mileage (via PID 0x31), raw EEPROM mileage (accessed through a direct memory read), key usage mileage (such as from Ford's MyKey system), engine hours from the ECM, crash event mileage from the airbag control module, cached mileage from the infotainment system, and mileage logged during gateway programming events. Each of these data points provides additional insights into the vehicle's true usage and is saved for later analysis. Finally, the function logs the non-standard data, closes the connection, and returns the nsData dictionary.

When multiple indirect data points are available through the vehicle's DLC, a more accurate estimate of actual mileage can be achieved by combining their respective contributions. This approach uses engine runtime, engine hours, and fuel consumption, each suitably multiplied by reasonable assumptions regarding average vehicle operation, to generate independent mileage estimates. These estimates are then weighted and combined to yield a more reliable final value. In an example embodiment, the following standard OBD-II data has been retrieved:

Engine Runtime (Mode 01 PID 1F): 65,535 seconds

Total Engine Hours (Mode 01 PID 90): 175 hours

Total Fuel Consumed (from PID 5E or internal fuel tracking): 250 gallons

Assumed Average Speed: 35 miles per hour

Assumed Fuel Economy: 25 miles per gallon

First, the mileage estimated from engine runtime is calculated by converting seconds to hours and multiplying by the assumed average speed:

$$\text{EstimatedMileage\_runtime}=(432{,}000\div 3600)\times 35=120\times 35=4{,}200\text{ miles}$$

Second, the mileage based on total engine hours is calculated directly as:

$$\text{EstimatedMileage\_engineHours}=175\times 35=6{,}125\text{ miles}$$

Third, the estimate based on fuel consumption and assumed fuel economy is:

$$\text{EstimatedMileage\_fuel}=250\times 25=6{,}250\text{ miles}$$

To produce a balanced final estimate, the three values are combined using a weighted average based on confidence in each source. Assigning weights of 0.25 for engine runtime, 0.35 for engine hours, and 0.40 for fuel consumption, the final combined estimate is:

$$\text{Combined Estimate}=(0.25\times 4{,}200)+(0.35\times 6{,}125)+(0.40\times 6{,}250)=1{,}050+2{,}143.75+2{,}500=5{,}693.75\text{ miles}$$

Thus, the final estimated mileage is approximately 5,694 miles.

If the vehicle's odometer displays a significantly lower value, such as 3,200 miles, this estimated value creates a discrepancy of over 2,400 miles, which may indicate odometer rollback. Because the result is derived from multiple independent ECU data sources, it carries a higher level of confidence than a single-source estimate.

The weighting factors used in the combined mileage estimate, specifically 0.25 for engine runtime, 0.35 for total engine hours, and 0.40 for fuel consumption, were selected based on the relative reliability, independence, and typical resistance to tampering of each data source. These weights are not arbitrary; rather, they reflect how each indirect metric tends to perform in real-world diagnostic scenarios when used to estimate total vehicle mileage.

Fuel consumption was given the highest weight of 0.40 because it is often the most stable and tamper-resistant metric. When fuel usage is recorded cumulatively within the ECU, typically based on injector pulse width or internal fuel maps, it provides a mileage estimate that is independent of odometer manipulation and is rarely reset or altered. Assuming the fuel economy used for the estimate is reasonably accurate, this method serves as a strong and credible indicator of actual vehicle usage.

Engine hours were assigned a slightly lower weight of 0.35. These are generally reliable, especially when retrieved from the ECM, and are not typically reset during standard service or odometer rollback. Engine hours reflect the total accumulated runtime of the engine regardless of driving speed, and when multiplied by a representative average vehicle speed, they yield a strong secondary mileage estimate. However, since they do not account for how the vehicle was driven (e.g., highway vs. idling), the weight is slightly lower than fuel consumption.

Engine runtime in seconds (PID 1F) was assigned the lowest weight of 0.25. Although it can be useful, this value is more volatile. It often resets when diagnostic trouble codes are cleared or during ECU reprogramming events. Additionally, engine runtime may not capture all usage time accurately, especially if the engine was running while the key was in accessory or diagnostic modes. For these reasons, while still valuable, it is treated as the least authoritative of the three indirect sources.

Using weighting in this way allows the system to reflect confidence levels in each metric and to minimize the impact of any one potentially unreliable value. If a particular data point is missing or unavailable on a given vehicle, the system can adapt by redistributing the weights across the available sources. This flexibility adds robustness to the mileage estimation process and supports more consistent fraud detection.

In example embodiments, the weighting factors applied to the individual estimated mileage values may be configured within defined ranges to reflect the relative reliability of each data source. For example, the weighting factor for the mileage estimate derived from fuel consumption data may be set within a range of 0.35 to 0.45, reflecting the typically high accuracy and resistance to tampering associated with cumulative fuel usage metrics. The weighting factor for the mileage estimate derived from total engine hours may be set within a range of 0.30 to 0.40, based on its general reliability and consistent availability from engine control modules. The weighting factor for the mileage estimate derived from engine runtime in seconds may be set within a lower range of 0.20 to 0.30, as this parameter is more susceptible to resets or variability due to diagnostic clearing or software updates. These ranges may be stored in memory and may be configured by the system based on default values, user-defined settings, or dynamic adjustment logic that accounts for data availability and reliability across different vehicle platforms.

In other example embodiments, the apparatus may be configured to dynamically adjust or redistribute the weighting factors used in the combined mileage estimation process based on the availability and reliability of the individual data sources. If one or more of the input parameters—such as fuel consumption, engine hours, or engine runtime—is unavailable, invalid, or determined to be outside of expected reliability bounds, the processor may recalculate the remaining weighting factors proportionally so that their sum remains normalized. For example, if only two valid data sources are available, the system may redistribute their weighting factors to maintain the same relative emphasis while allocating the total weight across only the available sources. This adaptive behavior ensures that the combined mileage estimate remains balanced and meaningful, even in the absence of complete input data, and improves the robustness of tamper detection across varying vehicle configurations and ECU implementations.

When available, both standard OBD-II data and non-standard OBD data are suitably used in combination to determine a likelihood of odometer fraud. Example pseudocode that combines both to make a determination follows:

```
FUNCTION determine OdometerFraud( ):
  // Retrieve previously saved standard and non-standard data sets
  standardData = retrieveStandardData( )  // Returns the dictionary with standard OBD-II data
  nsData = retrieve NonStandard Data( )   // Returns the dictionary with non-standard data
  // Define a margin threshold for discrepancies (e.g., 5000 miles)
  SET MARGIN = 5000
  SET fraudFlag = FALSE
  SET fraudReasons = [ ] // List to store reasons for potential fraud
  // Get the primary odometer reading and estimated mileage from standardData
  SET primaryOdometer = standard Data["primaryOdometer"]
  SET estimatedMileage = standardData["estimatedMileage"]
  // Compare estimated mileage with the primary odometer reading
  IF (estimatedMileage − primaryOdometer) > MARGIN THEN:
    SET fraudFlag = TRUE
    APPEND "Estimated mileage exceeds primary odometer by " + (estimatedMileage − primaryOdometer) + " miles." TO
fraudReasons
  END IF
  // Check if the distance since MIL activation exceeds the threshold
  IF standard Data["distance SinceMIL"] > MARGIN THEN:
    SET fraudFlag = TRUE
    APPEND "Distance since MIL activation exceeds threshold." TO fraudReasons
  END IF
  // Check if the distance since DTCs cleared exceeds the threshold
  IF standard Data["distance Since DTCclear"] > MARGIN THEN:
    SET fraudFlag = TRUE
    APPEND "Distance since DTCs cleared exceeds threshold." TO fraudReasons
  END IF
  // Compare non-standard values with the primary odometer reading
  IF (nsData["secondaryOdometer"] − primaryOdometer) > MARGIN THEN:
    SET fraudFlag = TRUE
    APPEND "Secondary odometer reading (PID 0xA6) exceeds primary odometer by " + (nsData["secondaryOdometer"] -
primaryOdometer) + " miles." TO fraudReasons
  END IF
  IF (nsData["routineMileage"] − primaryOdometer) > MARGIN THEN:
    SET fraudFlag = TRUE
```

-continued

```
    APPEND "Routine mileage (PID 0x31) exceeds primary odometer by " + (nsData["routineMileage"] − primaryOdometer) + "
miles." TO fraudReasons
  END IF
  IF (nsData["rawEEPROMMileage"] − primaryOdometer) > MARGIN THEN:
    SET fraudFlag = TRUE
    APPEND "Raw EEPROM mileage exceeds primary odometer by " + (nsData["rawEEPROMMileage"] − primaryOdometer) + "
miles." TO fraudReasons
  END IF
  IF (nsData["keyUsageMileage"] − primaryOdometer) > MARGIN THEN:
    SET fraudFlag = TRUE
    APPEND "Key usage mileage exceeds primary odometer by " + (nsData["keyUsageMileage"] − primaryOdometer) + " miles."
TO fraudReasons
  END IF
  // Process ECM engine hours if available: convert to mileage using an assumed average speed (e.g., 35 mph)
  IF nsData["ecmEngine Hours"] exists THEN:
    SET AVERAGE_SPEED = 35
    SET ecmMileage = nsData["ecmEngineHours"] * AVERAGE_SPEED
    IF (ecmMileage − primaryOdometer) > MARGIN THEN:
      SET fraudFlag = TRUE
      APPEND "ECM engine hours-derived mileage exceeds primary odometer by " + (ecmMileage − primaryOdometer) + "
miles." TO fraudReasons
    END IF
  END IF
  IF (nsData["crash EventMileage"] − primaryOdometer) > MARGIN THEN:
    SET fraudFlag = TRUE
    APPEND "Crash event mileage exceeds primary odometer by " + (nsData["crashEventMileage"] − primaryOdometer) + "
miles." TO fraudReasons
  END IF
  IF (nsData["infotainmentMileage"] − primaryOdometer) > MARGIN THEN:
    SET fraudFlag = TRUE
    APPEND "Infotainment cached mileage exceeds primary odometer by " + (nsData["infotainmentMileage"] − primaryOdometer)
+ " miles." TO fraudReasons
  END IF
  IF (nsData["gatewayProgrammingMileage"] − primaryOdometer) > MARGIN THEN:
    SET fraudFlag = TRUE
    APPEND "Gateway programming log mileage exceeds primary odometer by " + (nsData["gatewayProgrammingMileage"] −
primaryOdometer) + " miles." TO fraudReasons
  END IF
  // Compile the fraud analysis result
  SET analysisResult = {
    "fraudFlag": fraudFlag,
    "fraudReasons": fraudReasons,
    "primaryOdometer": primaryOdometer,
    "estimatedMileage": estimatedMileage,
    "standardData": standardData,
    "nonStandardData": nsData
  }
  // Log the analysis result for further review
  logAnalysis(analysisResult)
  RETURN analysisResult
END FUNCTION
```

Figure 6:
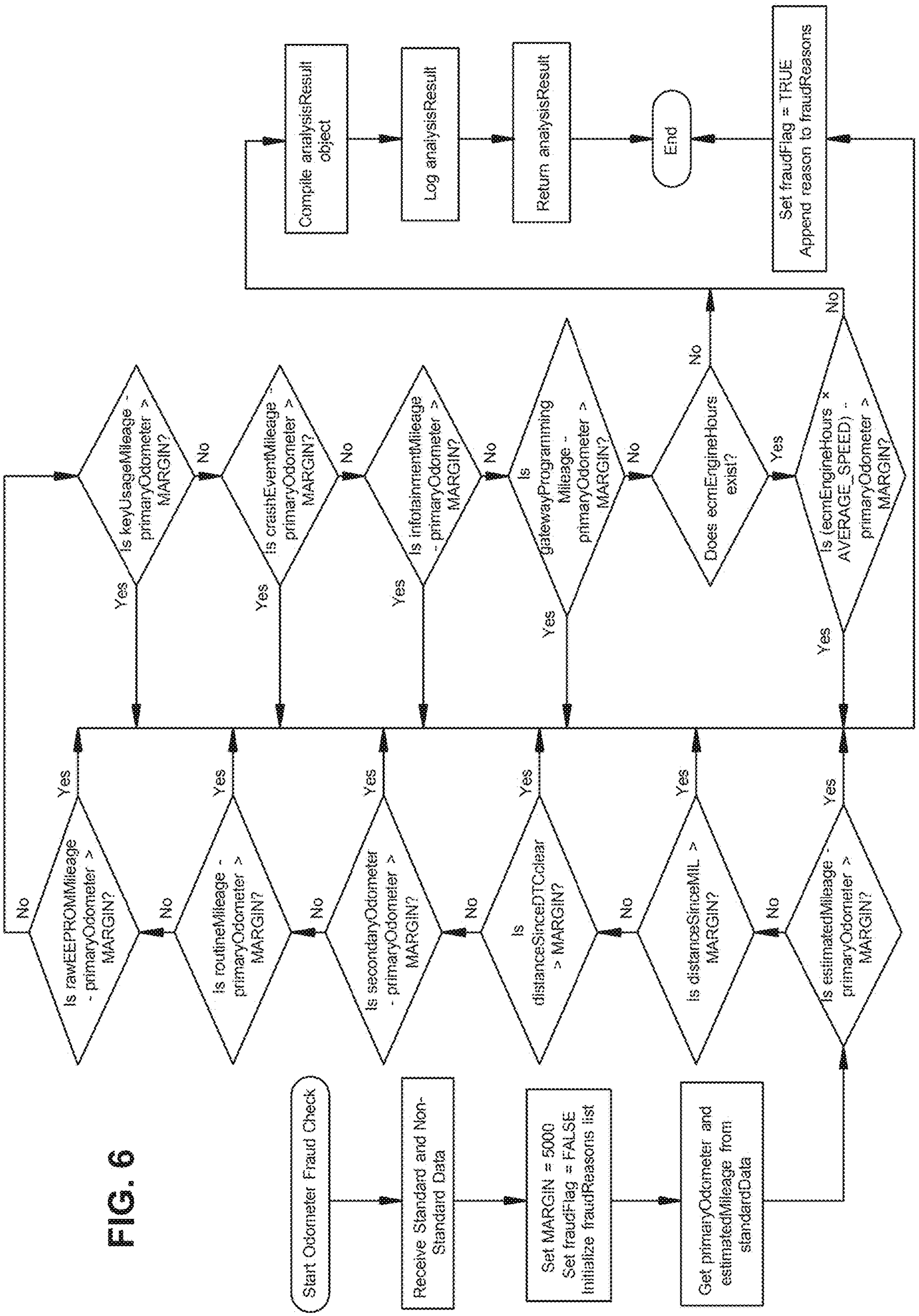
FIG. 6 is a mapping of pseudocode wherein Standard OBD-II data and/or non-standard OBD data are used to determine a likelihood of odometer fraud.

FIG. 6 provides a visual mapping of this pseudocode. The example determineOdometerFraud function combines the two previously gathered data: the standard OBD-II data (standardData) and the non-standard, manufacturer-specific data (nsData). It begins by defining a discrepancy margin (for example, 5000 miles). Then, the function retrieves the primary odometer reading and the estimated mileage (calculated from engine runtime/hours) from the standard data, and it compares the two. If the difference exceeds the margin, it flags potential fraud and records the reason.

Next, the function checks other standard data indicators such as the distance since MIL activation and the distance since DTC clearance. It then compares each non-standard value (including secondary odometer reading from PID 0xA6, routine mileage from PID 0x31, raw EEPROM mileage, key usage mileage, crash event mileage, cached infotainment mileage, and gateway programming mileage) against the primary odometer reading. For ECM engine hours, if available, it converts the hours to an estimated mileage using an assumed average speed (for example, 35 mph) and then performs a similar comparison.

While a determination of the presence or absence of fraud tampering is valuable, a simple yes or no may leave significant room for error, particularly if a discrepancy threshold is set conservatively low. In other example embodiments, a user is also provided with a likelihood or probability of tampering. This empowers users to decide acceptable risk given their particular circumstances. Pseudocode for a confidence level-based outcome follows:

```
FUNCTION calculateConfidence(standardData, nsData):
  // Define a discrepancy margin (in miles)
  SET MARGIN = 5000
  // Initialize variables for accumulating the score and maximum possible score
  SET confidenceScore = 0
```

-continued

```
    SET maxScore = 0
    // Indicator 1: Estimated Mileage Discrepancy
    SET diffEst = standardData["estimatedMileage"] − standardData["primaryOdometer"]
    SET weightEst = 0.3
    SET maxScore = maxScore + weightEst
    IF diffEst > MARGIN THEN:
      // Contribution is weighted based on how many times the margin is exceeded, capped at 1× the weight.
      SET contribution = weightEst * MIN(1, diffEst / (MARGIN * 3))
      SET confidenceScore = confidenceScore + contribution
    END IF
    // Indicator 2: Distance Since MIL Activation
    SET diffMIL = standardData["distanceSinceMIL"]
    SET weightMIL = 0.1
    SET maxScore = maxScore + weightMIL
    IF diffMIL > MARGIN THEN:
      SET contribution = weightMIL * MIN(1, diffMIL / (MARGIN * 3))
      SET confidenceScore = confidenceScore + contribution
    END IF
    // Indicator 3: Distance Since DTC Clear
    SET diffDTC = standardData["distanceSinceDTCclear"]
    SET weightDTC = 0.1
    SET maxScore = maxScore + weightDTC
    IF diffDTC > MARGIN THEN:
      SET contribution = weightDTC * MIN(1, diffDTC / (MARGIN * 3))
      SET confidenceScore = confidenceScore + contribution
    END IF
    // Indicator 4: Secondary Odometer Discrepancy (non-standard, PID 0xA6)
    SET diffSecondary = nsData["secondaryOdometer"] − standardData["primaryOdometer"]
    SET weightSecondary = 0.15
    SET maxScore = maxScore + weightSecondary
    IF diffSecondary > MARGIN THEN:
      SET contribution = weightSecondary * MIN(1, diffSecondary / (MARGIN * 3))
      SET confidenceScore = confidenceScore + contribution
    END IF
    // Indicator 5: Routine Mileage Discrepancy (non-standard, PID 0x31)
    SET diffRoutine = nsData["routineMileage"] − standardData["primaryOdometer"]
    SET weightRoutine = 0.15
    SET maxScore = maxScore + weightRoutine
    IF diffRoutine > MARGIN THEN:
      SET contribution = weightRoutine * MIN(1, diffRoutine / (MARGIN * 3))
      SET confidenceScore = confidenceScore + contribution
    END IF
    // Indicator 6: Raw EEPROM Mileage Discrepancy (non-standard)
    SET diffEEPROM = nsData["rawEEPROMMileage"] − standardData["primaryOdometer"]
    SET weightEEPROM = 0.1
    SET maxScore = maxScore + weightEEPROM
    IF diffEEPROM > MARGIN THEN:
      SET contribution = weightEEPROM * MIN(1, diffEEPROM / (MARGIN * 3))
      SET confidenceScore = confidenceScore + contribution
    END IF
    // Compute overall confidence level as a percentage of the maximum possible score.
    SET confidenceLevel = (confidenceScore / maxScore) * 100
    RETURN confidenceLevel
END FUNCTION
```

This pseudocode defines a function called calculateConfidence that computes a confidence level reflecting how strongly the gathered OBD data suggests that the odometer has been tampered with. The function uses a defined margin (set here as 5000 miles) as the threshold for acceptable differences between various indicators and the primary odometer reading. For each indicator, such as the discrepancy between the estimated mileage (calculated from engine runtime/hours) and the primary odometer, or differences from non-standard readings (like those from PID 0xA6 for a secondary odometer or PID 0x31 for routine mileage), the function calculates the difference. If the difference exceeds the margin, the function calculates a contribution to the overall confidence score by multiplying a weight (assigned to each indicator based on its reliability) by the ratio of the actual difference to a maximum expected difference (capped at 3 times the margin, to prevent overly high contributions). Each indicator's weight is added to a running maximum score. After processing all indicators, the confidence level is computed as the percentage of the total maximum score that the accumulated confidence score represents. This percentage serves as a measure of how likely it is that the odometer has been tampered with, with a higher percentage indicating stronger evidence of fraud. This approach allows for a flexible, weighted evaluation of multiple data sources and their discrepancies, resulting in a quantifiable confidence level that can be used as part of the fraud detection process.

Example use cases wherein an odometer is shown to be subject to tampering or borderline tampering are found in FIG. 5.

In addition to the odometer data stored within a vehicle's onboard systems, there are several external sources of mileage information that can be used to validate or cross-check a vehicle's reported odometer reading. These sources typically rely on historical records generated during routine servicing, state inspections, warranty claims, dealership maintenance, and vehicle registrations. While these data points are not retrieved directly from the vehicle itself, they can be instrumental in identifying inconsistencies, estimating true usage, or uncovering prior tampering. Access to these sources varies depending on the type of record and the entity maintaining it.

One available resource is a vehicle history report compiled by commercial services such as Carfax, AutoCheck, or NMVTIS (the National Motor Vehicle Title Information System). These services aggregate data from thousands of sources including dealerships, inspection stations, insurance companies, collision repair shops, and departments of motor vehicles. When a vehicle is serviced, inspected, or changes ownership, the recorded mileage is often submitted to these centralized databases, where it becomes part of a growing timeline of historical odometer readings. Access to these reports is available to the general public for a fee, typically by entering the vehicle's VIN (Vehicle Identification Number) into the provider's web portal. The reports often include a mileage log, title branding history, and flags for odometer discrepancies based on irregular mileage progression.

Dealerships and authorized service centers often maintain internal service records that include the odometer reading at the time of each visit. These records are not typically published online but are available upon request from the dealership's service department, particularly if the vehicle was serviced there consistently. Some manufacturers, such as Toyota, Ford, or BMW, allow registered owners to create online service accounts tied to their VINs, which grant access to partial service history, including past recorded mileage. Others may require in-person verification or a signed authorization form to release the full service history. For lease returns or vehicles sold through manufacturer-certified pre-owned (CPO) programs, dealers may provide complete mileage logs as part of the inspection and reconditioning documentation.

State and provincial motor vehicle agencies also record odometer readings during title transfers, registration renewals, or emissions inspections. In the United States, this information is often submitted to NMVTIS, which acts as a federal-level aggregator of state-reported data. While NMVTIS itself does not offer free public access, its data is integrated into services like Carfax and AutoCheck. Some individual states provide online tools where consumers can request title histories or inspection records for vehicles registered in their jurisdiction, usually for a nominal fee. The availability and details of this information vary widely by state.

In jurisdictions with mandatory periodic vehicle inspections, such as safety or emissions testing, odometer readings are recorded at each visit. These entries are commonly stored in centralized inspection databases operated by the state or contracted inspection providers. For example, in California and New York, emissions test history, including mileage, is available online through state environmental agency portals. Consumers can often retrieve this data by entering the vehicle's license plate number or VIN, which then returns a list of test dates and associated odometer readings.

Some insurance companies track vehicle mileage for underwriting purposes, especially in policies that use pay-per-mile or usage-based models. While this data is usually considered proprietary, policyholders may be able to request their vehicle's historical mileage logs directly from their insurer. In the event of a total loss claim or fraud investigation, insurance mileage records can be used to establish a timeline of vehicle use and compare it with reported odometer readings.

Lastly, some OEM telematics services, such as GM OnStar, Toyota Connected Services, or Hyundai Bluelink, periodically transmit odometer data to cloud-based systems for service tracking, diagnostics, or owner notifications. While this data originates from the vehicle itself, it resides externally on the manufacturer's servers and is not accessible through the OBD-II port. Access typically requires login credentials tied to the vehicle's VIN and owner account. In some cases, this data can be downloaded or printed through the OEM's customer web portal or mobile app, providing a reliable point of comparison if tampering is suspected.

Together, these alternative odometer data sources, vehicle history reports, dealership records, state inspection logs, insurance documents, and OEM telematics systems, form a network of external validation points that can be cross-referenced with the current odometer reading. While not all sources offer real-time access or comprehensive data, they can be critical in establishing a verifiable mileage history, particularly when onboard data is unavailable, inconsistent, or suspected of being manipulated. An example embodiment of pseudocode to integrate cloud-based data into a determination of odometer tampering follows:

```
FUNCTION getCloudData( ):
  // Connect to the cloud service using proper authentication credentials.
  connection = cloudConnect(credentials)
  IF connection is NOT successful THEN:
    logError("Unable to connect to cloud service")
    RETURN error
  END IF
  // Retrieve cloud data for the vehicle using its VIN
  vin = standardData["vin"] // Assume standardData was previously gathered locally
  cloudData = queryCloudDatabase(vin)
  // cloudData may include:
  //   - Cloud-reported odometer reading (e.g., from telematics or service records)
  //   - Historical service records with odometer values
  //   - DMV registration records, insurance records, etc.
  logCloudData(cloudData)
  RETURN cloudData
END FUNCTION
  FUNCTION analyzeCloudData(standardData, nsData, cloudData):
  // Define a threshold for acceptable odometer discrepancy in miles
  SET CLOUD_THRESHOLD = 5000
  // Initialize a cloud fraud indicator and a list for explanation reasons
  cloudFraudIndicator = FALSE
  reasons = [ ]
```

-continued

```
// Example 1: Compare the cloud-reported odometer with the primary local odometer
SET cloudOdometer = cloudData["reportedOdometer"]
SET primaryOdometer = standardData["primaryOdometer"]
IF ABS(cloudOdometer − primaryOdometer) > CLOUD_THRESHOLD THEN:
   cloudFraudIndicator = TRUE
   APPEND "
```

The cloud-based module in this system supplements local diagnostic data with externally sourced records from a cloud service. The function getCloudData( ) begins by establishing a secure connection to a cloud-based database using proper authentication. Once connected, it retrieves data based on the vehicle's VIN, which is already collected from the local standard OBD-II data. This external cloud data typically includes the odometer readings reported by telematics systems, historical service records with mileage data, and even registration records from DMV or insurance sources. The retrieved cloud data is then logged for audit purposes and returned for further analysis.

The analyzeCloudData( ) function takes as input the locally collected standard and non-standard data along with the cloud data. It first defines a discrepancy threshold (for example, 5000 miles). It then compares the cloud-reported odometer reading with the local primary odometer reading. If the difference between these values exceeds the threshold, it flags this as a potential indication of odometer tampering and records an explanatory note. Additionally, if historical service records are available from the cloud data, the function computes an expected odometer reading from these records and compares it with the local reading. Significant discrepancies here also trigger a fraud flag. Based on these comparisons, the function assigns a confidence level (e.g., "High (~100%)" if discrepancies are significant, or "Low (~0%)" if no issues are found) and returns a summary containing the fraud indicator, confidence level, and reasons.

Finally, the determineOverallFraud( ) function integrates the local analysis (from the standard and non-standard data) with the cloud analysis. It calls the respective functions to retrieve standard data (getStandardOBDData( ), non-standard data (getNonStandardData( ), and cloud data (getCloudData( ). It then runs separate analyses on the local data (using a function like analyzeLocalData( ) which is assumed to be defined elsewhere) and on the cloud data (using analyzeCloudData( ). If either analysis flags potential fraud, the overall system marks the vehicle as potentially tampered. It also combines the reasons and computes an overall confidence level by integrating the confidence levels from both local and cloud analyses. The final fraud determination, along with its supporting data and a confidence score, is then saved and returned.

This cloud-based integration enhances the overall odometer fraud detection system by providing an independent external validation of mileage data. The combination of local diagnostic information and cloud records enables a more robust determination of whether odometer tampering has occurred, thereby increasing the reliability of the fraud detection process.

Under ideal conditions, when the system has access to all three sources of data, standard OBD-II data, non-standard OBD data and cloud-based data, an anticipated rate of accurate fraud determination can be quite high, estimated in the range of 90% to 95%. This high accuracy comes from the fact that each source provides an independent verification of mileage. The standard OBD-II data offers real-time and historical usage indicators such as engine runtime and distances since fault codes were cleared. Non-standard OBD data, though sometimes only partially available, can yield additional independent mileage values (for example, via manufacturer-specific PIDs like $0xA6 and $0x31). Finally, cloud-based or online data, such as telematics records, service history, and registration data, further corroborates the vehicle's usage history.

When all these data points align, any significant discrepancy (like a rolled-back odometer) is flagged with high confidence. However, it is to be noted that overall accuracy depends on data quality and availability. In cases where some non-standard or online data are missing or incomplete, the accuracy may be lower. Nevertheless, by integrating multiple independent data streams, the system is designed to reduce false negatives and false positives, resulting in a robust and reliable fraud detection mechanism.

Professional odometer tampering analysis is typically a multi-step process conducted by automotive forensic specialists or specialized diagnostic centers. The resulting analysis is presented in a detailed report that includes the estimated true mileage of the vehicle, a comparison of all gathered data points, and an explanation of any discrepancies. The report typically outlines which readings are consistent, which diverge, and provides evidence of potential tampering if the readings do not align with expected patterns. These services are designed to be highly accurate, often with an estimated reliability in the range of 90% to 95%, noticing accuracy depends on the quality and completeness of the available data.

These results can be compared to engaging a professional to evaluate odometer fraud. Time and expense for a professional odometer tampering analysis might typically require anywhere from one to two hours of diagnostic work, plus additional time for data interpretation and report preparation. Costs can vary widely depending on the complexity of the vehicle's electronic systems, the region, and the expertise of the service provider, but a rough estimate might range from $200 to $600. More in-depth forensic investigations may take longer and incur higher costs.

The resulting professional analysis is typically presented in a detailed report that includes the estimated true mileage of the vehicle, a comparison of all gathered data points, and an explanation of any discrepancies. The report typically outlines which readings are consistent, which diverge, and provides evidence of potential tampering if the readings do not align with expected patterns. These services are designed to be highly accurate and are often rated with an estimated reliability in the range of 90% to 95%. This is also the range noted above that can be accomplished by an unsophisticated user quickly and inexpensively using systems and methods described herein.

FIG. 7 illustrates a table of example VIN-to-ECU mapping wherein ECUs that have alternative odometer PID information from which vehicle mileage may be found, inferred or calculated are identified for specific vehicles.

This information is suitably housed in a cloud service, such as cloud service 172 of FIG. 1.

The particulars shown herein are by way of example only for purposes of illustrative discussion and are not presented in the cause of providing what is believed to be a most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An electronic diagnostic system for detecting odometer tampering in a vehicle under test by analyzing mileage data from multiple vehicle electronic control units (ECUs), the system comprising:

a diagnostic interface configured to receive on-board diagnostic data from an associated vehicle;

a controller, including a processor and associated memory, in data communication with the diagnostic interface;

the controller configured to identify one or more ECUs that include vehicle operation data from which vehicle mileage can be calculated or inferred in accordance with a vehicle identification number (VIN);

the controller further configured to retrieve vehicle operation data from one or more identified ECU;

the controller further configured to compare each retrieved mileage value to a primary odometer reading; and the controller further configured to generate a discrepancy alert in response to detection of material inconsistencies between the primary odometer reading and retrieved vehicle operation data.

2. The electronic diagnostic system for detecting odometer tampering in the vehicle of claim 1, wherein the retrieved vehicle operation data includes data from OEM proprietary parameter identifiers (PIDs), the OEM proprietary PIDs being specific to the vehicle manufacturer.

3. The electronic diagnostic system for detecting odometer tampering in the vehicle of claim 1, wherein the apparatus is further configured to retrieve historical mileage data related to the vehicle under test from a cloud-based server associated with the vehicle.

4. The electronic diagnostic system for detecting odometer tampering in vehicles of claim 1, wherein the controller includes logic configured to derive a fraud detection confidence score, the fraud detection confidence score being increased in response to detection of multiple inconsistencies.

5. The electronic diagnostic system for detecting odometer tampering in a vehicle of claim 4, wherein the fraud detection confidence score is derived for vehicle operation data from one or more parameter identifier (PID).

6. The electronic diagnostic system for detecting odometer tampering a vehicle of claim 4, wherein the fraud detection confidence score is characterized as one of high confidence of odometer accuracy, lower confidence of odometer accuracy, and odometer accuracy is suspect.

7. The electronic diagnostic system for detecting odometer tampering in a vehicle of claim 1, wherein the controller is operative to detect a fraud detection confidence score autonomously in response to generation of a discrepancy alert.

8. The electronic diagnostic system for detecting odometer tampering in a vehicle of claim 7, wherein the controller is further configured to derive the fraud detection confidence score from a stored primary odometer reading and stored vehicle operation data in response to user input.

9. The electronic diagnostic system for detecting odometer tampering in vehicles of claim 1, further comprising a display configured to show a comparison of the primary odometer reading and retrieved vehicle operation data.

* * * * *